United States Patent
Kikuta et al.

(10) Patent No.: US 6,908,175 B2
(45) Date of Patent: Jun. 21, 2005

(54) PRINTING APPARATUS AND PRINT CONTROL METHOD

(75) Inventors: Masaya Kikuta, Kanagawa (JP); Hiroyuki Tamaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 10/411,195

(22) Filed: Apr. 11, 2003

(65) Prior Publication Data

US 2003/0193533 A1 Oct. 16, 2003

(30) Foreign Application Priority Data

Apr. 15, 2002 (JP) ........................ 2002-112651
Apr. 26, 2002 (JP) ........................ 2002-127273

(51) Int. Cl.$^7$ ................................................. B41J 29/38
(52) U.S. Cl. ........................................ 347/41; 358/1.17
(58) Field of Search ............................ 347/12, 14, 41; 358/1.14, 1.15, 1.16, 1.17

(56) References Cited

U.S. PATENT DOCUMENTS

| | | | | |
|---|---|---|---|---|
| 4,254,439 A | * | 3/1981 | Fowler et al. ............... | 358/410 |
| 4,272,771 A | * | 6/1981 | Furukawa .................... | 347/12 |
| 4,313,124 A | | 1/1982 | Hara ............................ | 347/57 |
| 4,345,262 A | | 8/1982 | Shirato et al. ................ | 347/10 |
| 4,459,600 A | | 7/1984 | Sato et al. ................... | 347/47 |
| 4,463,359 A | | 7/1984 | Ayata et al. ................. | 347/56 |
| 4,558,333 A | | 12/1985 | Sugitani et al. .............. | 347/65 |
| 4,608,577 A | | 8/1986 | Hori ............................. | 347/66 |
| 4,723,129 A | | 2/1988 | Endo et al. ................... | 347/56 |
| 4,740,796 A | | 4/1988 | Endo et al. ................... | 347/56 |
| 5,412,483 A | * | 5/1995 | Ludlow et al. ............... | 358/401 |
| 5,519,416 A | | 5/1996 | Hayasaki et al. ............. | 347/13 |
| 5,907,332 A | | 5/1999 | Fujita et al. .................. | 347/15 |
| 5,949,452 A | * | 9/1999 | Jones .......................... | 347/41 |
| 6,097,499 A | | 8/2000 | Casey et al. ................. | 347/1.16 |
| 6,102,510 A | | 8/2000 | Kikuta et al. ................. | 347/9 |
| 6,260,946 B1 | * | 7/2001 | Hori ............................. | 347/41 |
| 2003/0193543 A1 | * | 10/2003 | Uemura ....................... | 347/37 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |
| JP | 11-259248 | 9/1999 |

* cited by examiner

Primary Examiner—Lamson Nguyen
Assistant Examiner—Blaise Mouttet
(74) Attorney, Agent, or Firm—Fitzpatrick, Cella, Harper & Scinto

(57) ABSTRACT

This invention provides a low-cost printing apparatus and print control method capable of high-quality printing even in the use of a data buffer smaller in capacity than print data necessary for printing by one scanning of a printhead. According to this method, in printing using a small-capacity print buffer, print data is read out for each block of the print buffer divided into a plurality of blocks. Printing is done while the printhead is being scanned. As for printing using print data stored in the final block, printing is performed by one scanning of the printhead using print data stored in all blocks except the final block and print data obtained by sampling part of the print data stored in the final block. Further, printing is performed by the next scanning of the printhead using the remaining sampled data and print data newly stored in all the blocks except the final block.

19 Claims, 20 Drawing Sheets

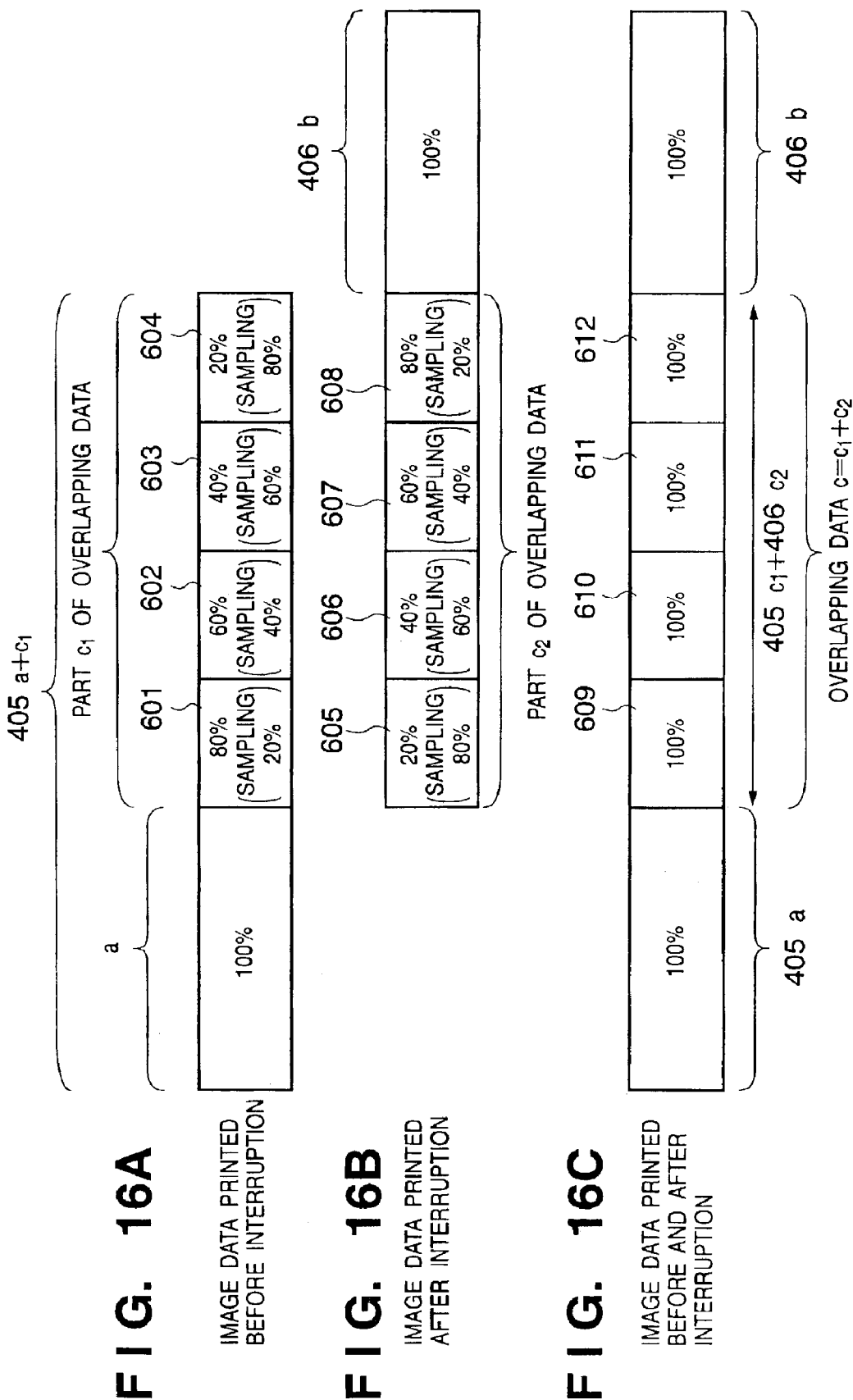

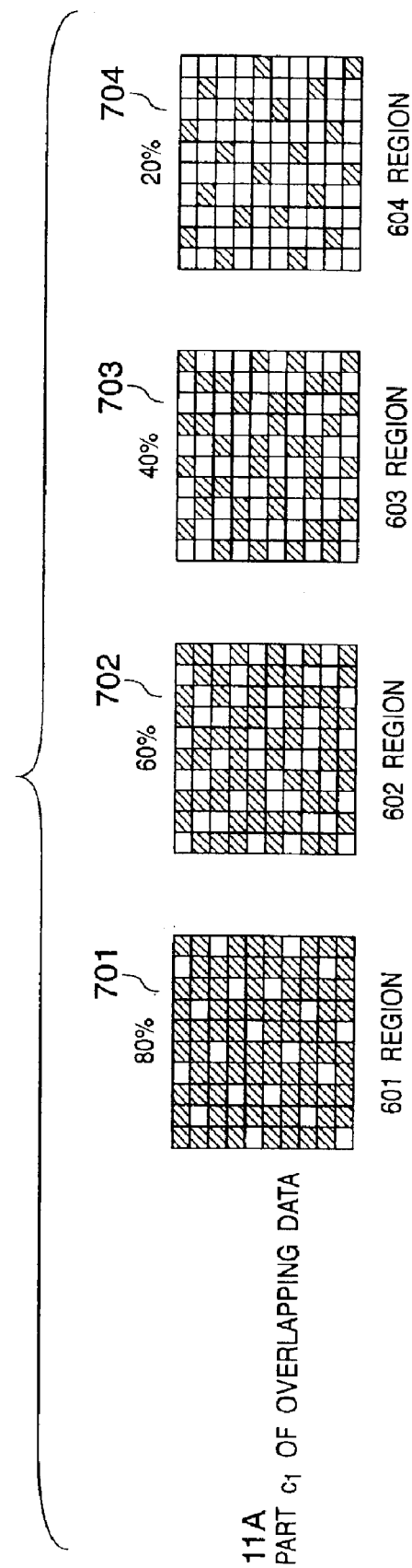

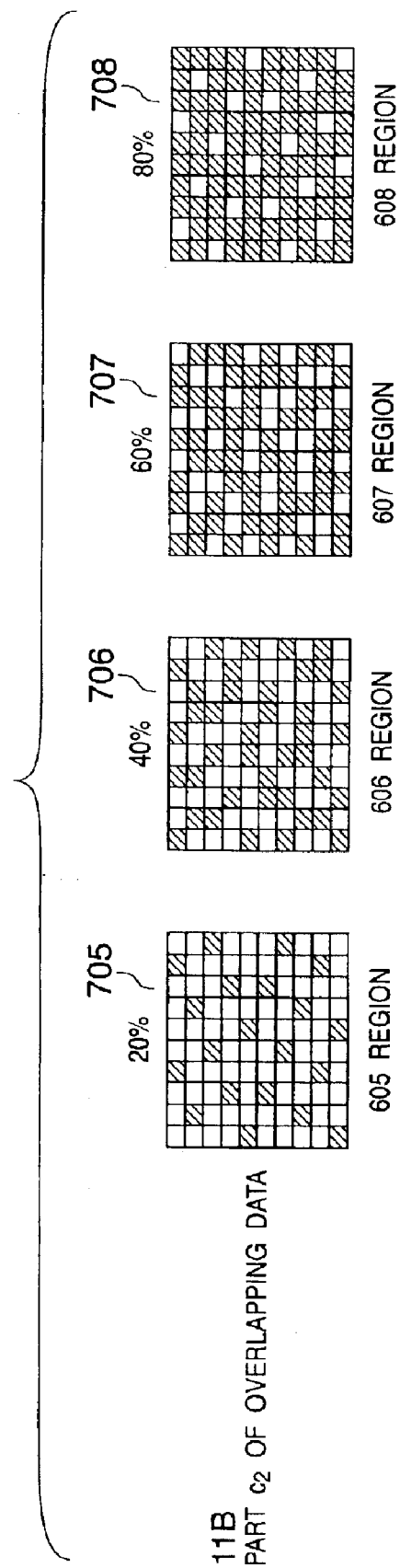

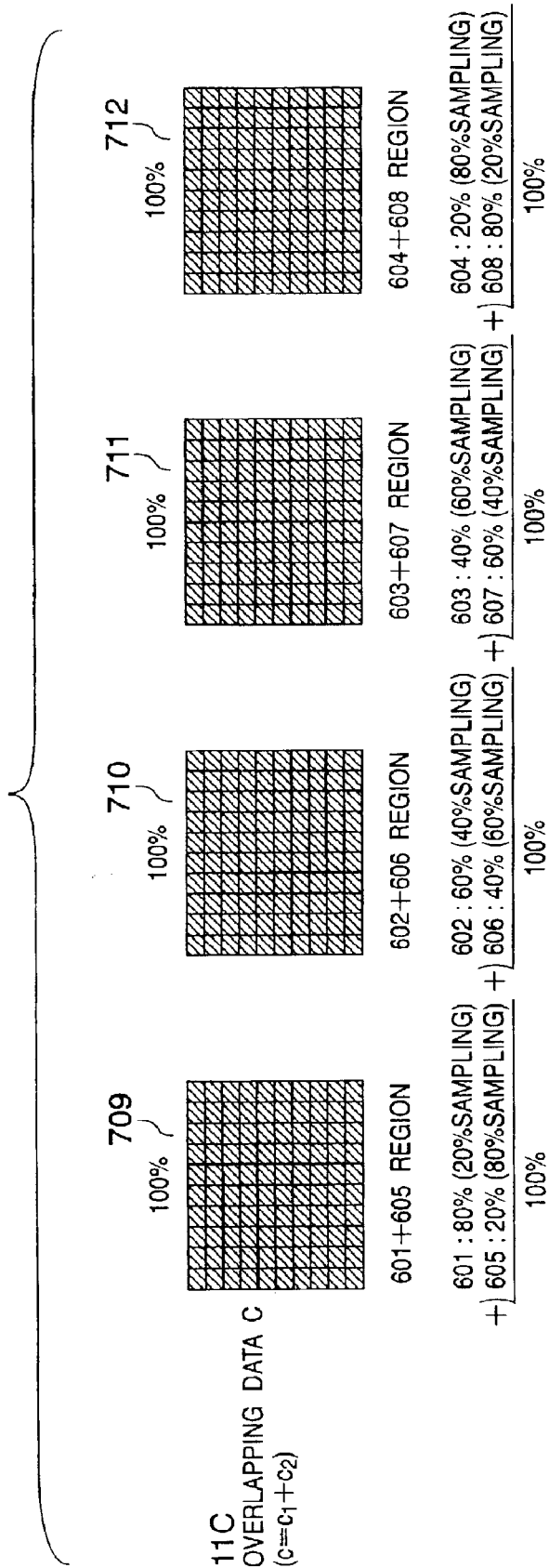

PRINTING APPARATUS AND PRINT CONTROL METHOD

CLAIM OF PRIORITY

This application claims priority from Japanese Patent Application Nos. 2002-112651 and 2002-127273, respectively entitled "Printing Apparatus and Print Control Method" and "Image Printing Apparatus and Its Control Method", which are incorporated herein by reference.

FIELD OF THE INVENTION

This invention relates to a printing apparatus and print control method and, more particularly, to a printing apparatus and print control method using a data buffer smaller in capacity than a print data amount used when a printing apparatus, complying with an inkjet printing method of discharging ink droplets to, e.g., a printing medium and forming an image, scans a printhead once and prints data in a printing region determined by a printhead scannable width.

BACKGROUND OF THE INVENTION

There is conventionally known a serial printer which receives print data from a host computer (to be referred to as a host hereinafter), conveys a printing medium such as a printing sheet, and prints data while reciprocally scanning a printhead by using the received data.

The serial printer repeats data reception from the host and printing by the printhead. To adjust the reception speed and printing speed, the serial printer generally employs a data buffer which stores print data necessary for printing by at least one scanning of the printhead.

As the printing width of the printhead becomes longer or the number of print elements increases for a higher printing resolution, the data buffer capacity also increases. The printer must be equipped with an expensive, large-capacity memory, thus resulting in increasing the printer cost.

To suppress an increase in cost along with an increase in data buffer capacity, the data amount along the array direction (sub-scanning direction) of print elements of the printhead per scanning/printing of the printhead is intentionally decreased in a printer with small data buffer memory capacity.

Some printers employ a data buffer whose capacity is smaller than print data necessary for printing by one scanning of the printhead.

Recently, the printing resolution of printing apparatuses such as a printer which prints digital images is increasing along with the spread of personal computers, digital cameras, and the like. Of printing apparatuses, inkjet printing apparatuses using an inkjet printhead rapidly prevail. Demands further arise for lower-cost inkjet printing apparatuses which realize high-resolution images.

A serial scanning inkjet printing apparatus prints an image by one scanning at the printhead width while scanning the printhead in a direction (main scanning direction) perpendicular to the conveyance direction (sub-scanning direction) of a printing medium such as a printing sheet. At the end of printing by one scanning, the inkjet printing apparatus conveys the printing medium by the printhead width in the conveyance direction. The inkjet printing apparatus sequentially repeats image printing by one scanning and conveyance of the printing medium described above, forming a desired image on the printing medium.

In a conventional printing apparatus, data sent from the host are data sequentially arrayed in the main scanning direction (to be referred to as raster data hereinafter). To print an image by one scanning at the printhead width, data must be converted into data sequentially arrayed in the sub-scanning direction (to be referred to as column data hereinafter) in accordance with the number of print elements (e.g., the number of ink discharge nozzles) of the printhead. To print an image by one scanning, the printing apparatus must hold at least a memory area for accumulating raster data for the number of discharge nozzles and a memory area for accumulating column data.

As described above, higher image quality by higher-resolution printing of the printing apparatus is required. A higher resolution of the printing apparatus increases the data amount necessary for image printing. The memory area necessary for the printing apparatus also increases, which inhibits cost reduction of the printing apparatus.

A technique of reducing the memory area necessary for the printing apparatus is disclosed in Japanese Patent Publication Laid-Open No. 11-259248. According to this publication, the memory capacity necessary for the printing apparatus can be reduced by the following data transfer between the host and the printing apparatus while buffering is minimized.

More specifically, data is transferred between the host and the printing apparatus by dividing image data necessary for printing by one scanning of the printhead into a plurality of blocks (each block will be referred to as a data frame). When the printing apparatus receives image data transferred from the host, the printing apparatus processes the image data and temporarily holds it in the memory area of the printing apparatus. This memory area stores one or more data frames during printing operation by one scanning of the printhead.

In this data transfer in which image data necessary for printing by one scanning of the printhead is divided into a plurality of data frames, data frames of image data are successively transmitted to the memory area of the printing apparatus. The memory area size suffices to ensure at least a memory area capable of storing one or more data frames, and the memory area need not store image data for one scanning. Unlike a conventional printing apparatus, a memory area for storing image data for one scanning is not required.

In the above-described data transfer, printing operation can start upon reception of minimum data necessary for image printing without storing image data necessary for printing by one scanning of the printhead in the memory area of the printing apparatus. Sequentially transmitted data frames are stored in the memory area of the printhead while rewriting the memory area. An image by one scanning can be formed without interrupting scanning of the printhead, while the memory capacity necessary for the printing apparatus can be reduced.

If print data is not completely mapped in the buffer during printing by scanning the printhead in the use of a small-capacity buffer which cannot store print data for one scanning, data is printed up to the mapped position, and scanning/printing stops. After the remaining print data is mapped in the buffer, the printhead must be scanned from the position where previous printing ends, restarting printing. When the printhead is scanned to print data upon reception of print data for less than one scanning from the host apparatus, subsequent print data may be mapped in the buffer area at the end of printing, and printed. This arrangement also suffers the same problem when a communication error occurs between the host and the printing apparatus or when the next print data cannot be completely transferred before the completion of printing by one scanning because of a low transfer speed.

In the above arrangement in which printing is interrupted during scanning and restarts after print data is transferred, a printed image until the stop of printing/scanning and a printed image after the restart of printing/scanning may overlap each other, or a gap may be formed between the two printed images due to the influence of the operation precision of a mechanism of scanning the printhead and the control precision of the moving speed of the printhead in the scanning direction (main scanning direction), thus degrading the image quality.

In addition, in the above-described data transfer, a job and task in the host cannot be managed by the printing apparatus. Data transfer from the host to the printing apparatus may be left undone due to some reasons.

For example, if data transfer from the host to the printing apparatus is left undone after the start of printing operation by one scanning, the printing apparatus cannot print any image by the printhead. At this time, the printhead must stop at the position until the next image data is received, or must return to the home position (reference position) and wait until image data is stored in the memory area. After a sufficient amount of image data is stored in the memory area, the printhead is scanned again. In other words, the printing apparatus restarts printing from the position where printing stops due to the interruption of data transfer from the host, and completes image printing by one scanning.

If, however, image printing is interrupted during one scanning, a difference (printing time difference) in the printing time on a printing medium is generated between a dot printed at the interrupted position and a dot printed at a printing restart position adjacent to the interrupted position. It is generally known that the density change caused by the printing time difference appears as density unevenness (time difference unevenness) in a printed image due to the printing time difference.

The reason is as follows.

Ink droplets attached to a printing medium permeate in a direction perpendicular to the printing medium (e.g., paper) (direction of thickness of the printing medium) and a direction in which ink droplets spread on the surface of the printing medium. A pigment such as a dye serving as an ink component is physically and chemically bonded with the printing medium.

If a time difference ($t_2-t_1$) between printing times ($t_1$ and $t_2$) when two adjacent dots are printed is small, ink droplets attached to the printing medium later ($t_2$) also permeate in the direction perpendicular to the printing medium and the direction in which ink droplets spread on the surface of the printing medium. However, these ink droplets hardly permeate and fix in a region where ink droplets attached earlier ($t_1$) fix.

This is because ink droplets attached earlier ($t_1$) are still permeating, and a limited amount of ink component can be chemically bonded with the printing medium. Thus, ink droplets attached later ($t_2$) permeate and fix further below the region where ink droplets attached earlier ($t_1$) permeated.

If the time difference ($t_1-t_2$) between the printing times ($t_1$ and $t_2$) when two adjacent dots are printed is large, ink droplets attached later ($t_2$) permeate by a larger amount than ink droplets for the small time difference ($t_2-t_1$) in the region where ink droplets attached earlier ($t_1$) permeated and fixed.

This is because ink droplets attached earlier ($t_1$) sufficiently permeated and spread, or the volatile component of ink droplets evaporated, the ink droplet amount per unit area decreases, and ink droplets attached later ($t_2$) can spread and penetrate to the region of ink droplets attached earlier ($t_1$).

More specifically, if the printing time difference between adjacent dots is large, a large amount of ink, i.e., a pigment or ink component such as a dye fixed near the surface of the printing medium remains. The density depends on light absorption of the pigment fixed near the surface of the printing medium, and a larger printing time difference leads to a higher density. If printing operation is interrupted during one scanning, density unevenness occurs in images printed before and after interruption, and the boundary between the images before and after interruption appears as a stripe. This greatly degrades the quality of the printed image.

[Image Quality When Data Transfer is Left Undone (FIGS. 18A and 18B)]

Degradation of the image quality when data transfer from the host to the printing medium is left undone, as described above, will be explained in detail with reference to FIGS. 18A and 18B.

In FIG. 18A, image data of one scanning is divided into n data frames. Data frames of image data of one scanning transmitted from the host to the printing apparatus are transmitted in an order of 301, 302, . . . , 30n in FIG. 18A. According to FIG. 18A, the printing apparatus starts printing an image for one scanning at the printhead width upon reception of data up to, e.g., the data frame 303.

At this time, an image is printed sequentially from the data frame 301 on a printing medium, as shown in FIG. 18B. Image data accumulated in the memory area is decreased with the progress of image printing. Data frames sequentially transmitted from the host are stored in the memory area while the contents of the memory area of the printing apparatus are sequentially rewritten.

A case where data transfer from the host is left undone when the printing apparatus receives the data frames up to the data frame 305 shown in FIG. 18A will be explained.

If data transfer from the host is left undone when the printing apparatus receives the data frames up to the data frame 305, the printing apparatus interrupts image printing operation at the end of image printing using the data frame 305, halts the movement of the printhead at the current position or returns the printhead to the reference position, and waits until data is transferred again from the host. After data transfer from the host restarts and image data of the data frame 306 and subsequent data frames are accumulated by a necessary amount in the memory area of the printing apparatus, the printing apparatus restarts image printing from the interrupted position.

As shown in FIG. 18B, density unevenness occurs between dots (attached ink droplets) printed near the boundary between images 305 and 306 printed using the data frames 305 and 306 which have a printing time difference due to the interruption of data transfer from the host. This unevenness is recognized as a stripe near the boundary between the images 305 and 306. The stripe greatly degrades the image quality.

SUMMARY OF THE INVENTION

Accordingly, it is a first object of the present invention to provide a low-cost printing apparatus and print control method capable of high-quality printing even in the use of a data buffer smaller in capacity than print data necessary for printing by one scanning of a printhead.

According to one aspect of the present invention, the foregoing first object is attained by providing a printing apparatus which performs printing by driving a printhead on the basis of print data transmitted from a host apparatus, comprising: scanning means for scanning the printhead on a printing medium in a main scanning direction; a print buffer used to store print data transmitted from the host apparatus and transfer the print data to the printhead, and capable of storing print data smaller in amount than a print data amount for performing printing by scanning the printhead by a width scannable by the scanning means; printing means for dividing the print buffer into a plurality of blocks, reading out print data for each divided block, transferring the print data to the printhead, and performing printing while scanning the printhead by the scanning means; sampling means for sampling part of print data stored in a final block of the print buffer; and control means for, as for printing using the print data stored in the final block, performing printing by one scanning of the printhead using the print data stored in all blocks except the final block and the print data sampled by the sampling means, and performing printing by next scanning of the printhead using remaining data sampled by the sampling means and print data newly stored in all the blocks except the final block.

The printing apparatus desirably further comprises buffer input/output means for mapping the print data in the print buffer composed of the plurality of blocks every time reading out of print data from each block for printing by the printhead is completed.

The print buffer desirably has a ring buffer structure in which the plurality of blocks are cyclically used.

The sampling means desirably comprises a mask ROM. The mask ROM preferably stores, e.g., a sampling pattern used to sample, by 50% into a zigzag pattern, print data corresponding to pixels which have a two-dimensional layout in a print image on a printing medium.

The sampling means may use different sampling patterns for respective color components of color print data when color printing is performed. In this case, the sampling means preferably stores different sampling patterns in a mask ROM for the respective color components.

The scanning means includes a carriage.

It is desirable that the printhead in the above-described arrangement include an inkjet printhead, and the inkjet printhead has electrothermal transducers which generate heat energy to be applied to ink in order to discharge the ink by using the heat energy.

According to another aspect of the present invention, the foregoing first object is attained by providing a print control method in a printing apparatus having scanning means for scanning a printhead on a printing medium in a main scanning direction, and a print buffer capable of storing print data smaller in amount than a print data amount for performing printing by scanning the printhead by a width scannable by the scanning means, comprising: a printing step of dividing the print buffer into a plurality of blocks, reading out print data for each divided block, and performing printing while scanning the printhead by the scanning means; a sampling step of sampling part of print data stored in a final block of the print buffer; and a print control step of, as for printing using the print data stored in the final block, performing printing by one scanning of the printhead using the print data stored in all blocks except the final block and the print data sampled at the sampling step, and performing printing by next scanning of the printhead using remaining data sampled at the sampling step and print data newly stored in all the blocks except the final block.

In accordance with the present invention as described above, printing is done by repetitively using the print buffer smaller in capacity than a print data amount necessary for printing by one scanning of the printhead which is mounted in the scanning means and reciprocally moves. At this time, the print buffer is divided into a plurality of blocks. Print data is read out for each divided block. Printing is executed while the printhead is being scanned by the scanning means. As for printing using print data stored in the final block, printing is performed by one scanning of the printhead using print data stored in all blocks except the final block and print data obtained by sampling part of the print data stored in the final block. In addition, printing is performed by the next scanning of the printhead using the remaining sampled data and print data newly stored in all the blocks except the final block.

It is a second object of the present invention to provide an image printing apparatus and image printing method capable of suppressing degradation of the image quality caused by a time difference when an image is to be printed using data transferred from a host, data transfer is left undone during image printing, and the time difference is generated in image printing.

According to one aspect of the present invention, the foregoing second object is attained by providing a printing apparatus which prints an image by scanning a carriage holding a printhead on a printing medium on the basis of image data received from a host apparatus for each of data frames obtained by dividing, by a predetermined number, image data necessary to print an image by one scanning at a width corresponding to the number of nozzles of the printhead, comprising: detection means for detecting whether interruption occurs during printing due to a data frame reception delay; sampling means for, when the interruption is detected, sampling at least part of image data contained in a data frame received immediately before the reception delay so as to generate first and second data which have complementary relationship with each other; addition means for adding the second data to a data frame received after the interruption; and control means for controlling to print an image based on the first data before the interruption of printing, and print an image based on the second data on an area of the printing medium where the image based on the first data has been printed after the interruption of printing.

For example, the detection means preferably detects that interruption occurs during image printing when a time until a next data frame is received after the data frame is received exceeds a predetermined time.

For example, the sampling means preferably regards the first and second data as first and second data groups divided by the same number, and samples respective data belonging to the first and second data groups at different sampling ratios.

For example, the sampling means preferably performs sampling processing so as to increase stepwise the sampling ratio of data contained in the first data group, and performs sampling processing so as to decrease stepwise the sampling ratio of data contained in the second data group.

For example, the addition means preferably extracts the second data from the data frame received immediately before the reception delay, and adds the second data to a data frame first transmitted after the reception delay.

For example, the addition means preferably adds the second data to the heading portion of a data frame first transmitted after the reception delay.

For example, the printhead preferably includes an inkjet printhead which discharges ink to perform printing. The inkjet printhead preferably has an electrothermal transducer which generates heat energy to be applied to the ink in order to discharge the ink by using the heat energy.

According to another aspect of the present invention, the foregoing second object is attained by providing a printing apparatus control method of printing an image by scanning a carriage holding a printhead on a printing medium on the basis of image data received from a host apparatus for each of data frames obtained by dividing, by a predetermined number, image data necessary to print an image by one scanning at a width corresponding to the number of nozzles of the printhead, comprising: a detection step of detecting whether interruption occurs during image printing due to a data frame reception delay; a sampling step of, when the interruption is detected, sampling at least part of image data contained in a data frame received immediately before the reception delay so as to generate first and second data which have complementary relationship with each other; an addition step of adding the second data to a data frame received after the interruption; and a control step of controlling to print an image based on the first data before the interruption of printing, and print an image based on the second data on an area of the printing medium where the image based on the first data has been printed after the interruption of printing.

According to still another aspect of the present invention, the foregoing second object is attained by providing a control program of controlling a printing apparatus which prints an image by scanning a carriage holding a printhead on a printing medium on the basis of image data received from a host apparatus for each of data frames obtained by dividing, by a predetermined number, image data necessary to print an image by one scanning at a width corresponding to the number of nozzles of the printhead, comprising: a code for executing processing of detecting whether interruption occurs during printing due to a data frame reception delay; a code for executing processing of, when the interruption is detected, sampling at least part of image data contained in a data frame received immediately before the reception delay so as to generate first and second data which have complementary relationship with each other; a code for executing processing of adding the second data to a data frame received after the interruption; and a code for executing control processing so as to print an image based on the first data before the interruption of printing, and print an image based on the second data on an area of the printing medium where the image based on the first data has been printed after the interruption of printing.

According to still another aspect of the present invention, the foregoing second object is attained by providing a computer-readable storage medium which stores a control program of controlling an image printing apparatus which prints an image by scanning a carriage holding a printhead on a printing medium on the basis of image data received from a host apparatus for each of data frames obtained by dividing, by a predetermined number, image data necessary to print an image by one scanning at a width corresponding to the number of nozzles of the printhead, the control program comprising: a code for executing processing of detecting whether interruption occurs during printing due to a data frame reception delay; a code for executing processing of, when the interruption is detected, sampling at least part of image data contained in a data frame received immediately before the reception delay so as to generate first and second data which have complementary relationship with each other; a code for executing processing of adding the second data to a data frame received after the interruption; and a code for executing control processing so as to print an image based on the first data before the interruption of printing, and print an image based on the second data on an area of the printing medium where the image based on the first data has been printed after the interruption of printing.

The invention is particularly advantageous since image degradation by image overlapping or a gap between scanning/printing operations can be prevented by a simple arrangement and a high-quality image can be printed.

According to the other invention, when an image is to be printed using data transferred from the host and data transfer is left undone during image printing, a time difference is generated in image printing, but degradation of the image quality by the time difference can be suppressed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 16A, 16B, and 16C are views for explaining an example of a processing method of dividing each of parts $c_1$ and $c_2$ of overlapping data by a predetermined number and processing the divided overlapping data such that it represents a predetermined density gradient;

FIG. 17A is a view for explaining an example of mask data (part $c_1$ of overlapping data) used for processing in FIGS. 16A to 16C;

FIG. 17B is a view for explaining an example of mask data (part $c_2$ of overlapping data) used for processing in FIGS. 16A to 16C;

FIG. 17C is a view for explaining an example of mask data (overlapping data) used for processing in FIGS. 16A to 16C.

DETAILED DESCRIPTION OF THE PREFERRED EMBODIMENTS

Preferred embodiments of the present invention will now be described in detail in accordance with the accompanying drawings.

The following embodiments will exemplify a printing apparatus using an inkjet printhead. Further, the embodiments will exemplify a personal computer (to be referred to as a host hereinafter) as a host apparatus which transmits image printing data to the printing apparatus. However, the spirit and scope of the present invention are not limited to the following examples.

In this specification, "print" not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans.

Also, a "printing medium" not only includes a paper sheet used in common printing apparatuses, but also broadly includes materials, such as cloth, a plastic film, a metal plate, glass, ceramics, wood, and leather, capable of accepting ink.

Furthermore, "ink" (to be also referred to as a "liquid" hereinafter) should be extensively interpreted similar to the definition of "print" described above. That is, "ink" includes a liquid which, when applied onto a printing medium, can form images, figures, patterns, and the like, can process the printing medium, and can process ink (e.g., can solidify or insolubilize a coloring agent contained in ink applied to the printing medium).

Figure 1:
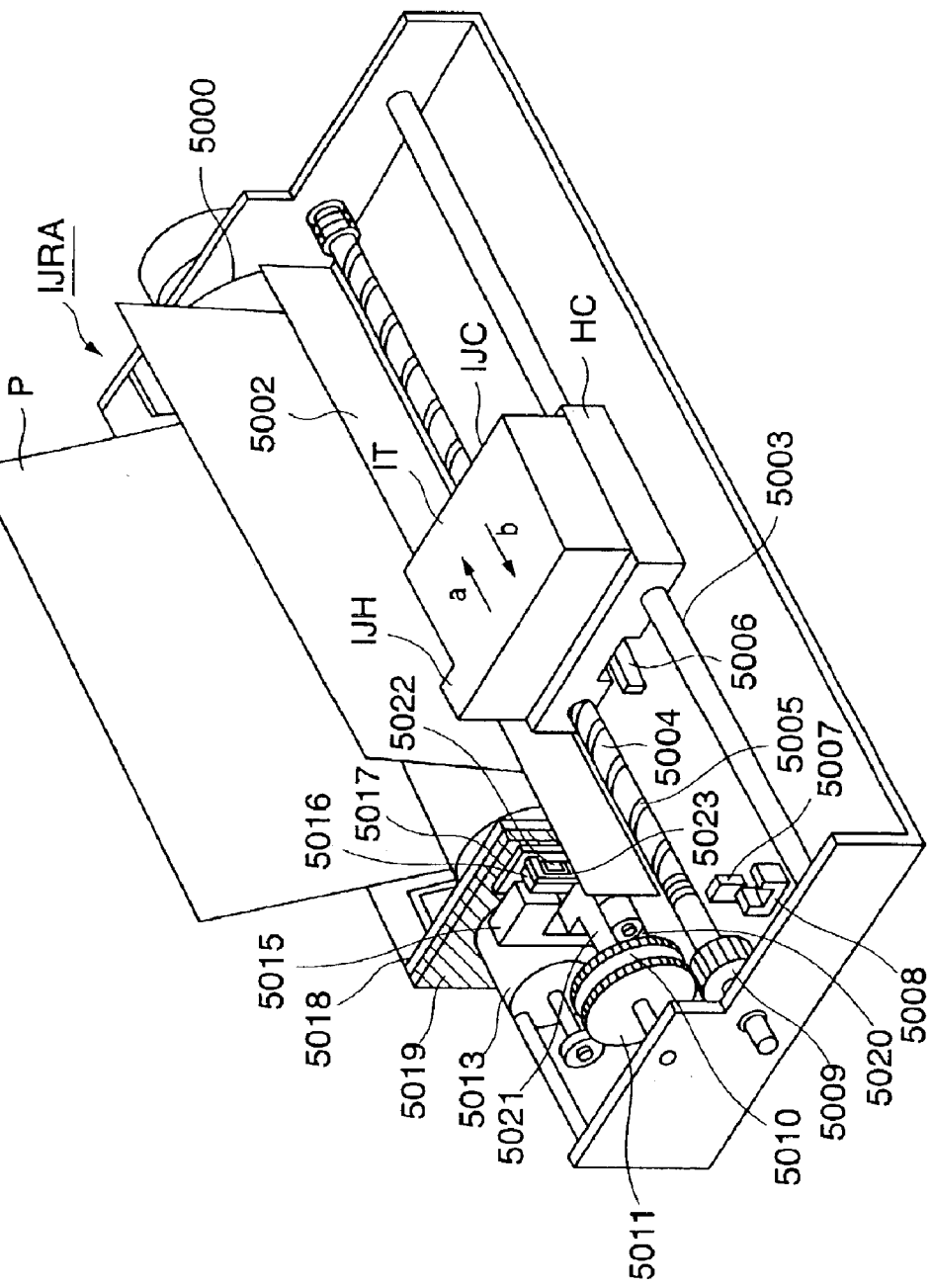
FIG. 1 a perspective view showing the arrangement of an inkjet printing apparatus according to a typical embodiment of the present invention.

FIG. 1 is a perspective view showing the outer appearance of an ink-jet printer IJRA as a typical embodiment of the present invention. Referring to FIG. 1, a carriage HC engages with a guide shaft 5004 and a spiral groove 5005 of a lead screw 5004, which rotates via driving force transmission gears 5009 to 5011 upon forward/reverse rotation of a driving motor 5013. The carriage HC has a pin (not shown), and is reciprocally scanned in the directions of arrows a and b in FIG. 1. An integrated ink-jet cartridge IJC which incorporates a printing head IJH and an ink tank IT is mounted on the carriage HC. Reference numeral 5002 denotes a sheet pressing plate, which presses a paper sheet against a platen 5000, ranging from one end to the other end of the scanning path of the carriage. Reference numerals 5007 and 5008 denote photocouplers which serve as a home position detector for recognizing the presence of a lever 5006 of the carriage in a corresponding region, and used for switching, e.g., the rotating direction of the motor 5013. Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment. Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5004 when the carriage reaches the home-position side region. However, the present invention is not limited to this arrangement as long as desired operations are performed at known timings.

Note that the ink tank IT and printhead IJH may be provided integrally to form the exchangeable ink cartridge IJC as mentioned above, or the ink tank IT and printhead IJH may be provided separably to enable exchange of the ink tank IT in a case where ink is exhausted.

Figure 2:
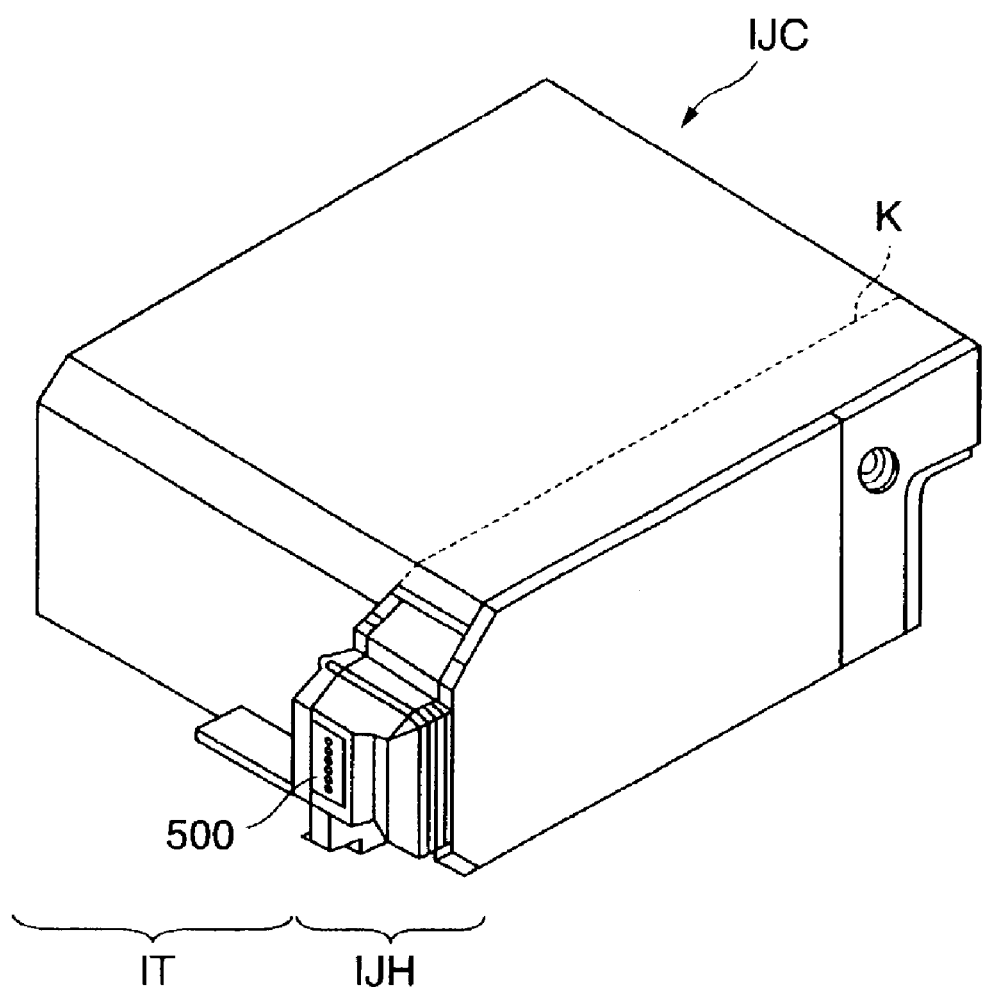
FIG. 2 is a perspective view showing the outer appearance of an ink cartridge.

FIG. 2 is a perspective view showing the structure of an ink cartridge IJC in which an ink tank and printhead are separable. As shown in FIG. 2, in the ink cartridge IJC, an ink tank IT and printhead IJH are separable at the position of a boundary line K. The ink cartridge IJC has electrodes (not shown) for receiving an electrical signal supplied from the carriage HC when it is mounted on the carriage HC. This electrical signal drives the printhead IJH to discharge ink, as described above.

Note that reference numeral 500 in FIG. 2 denotes an ink discharge port array. The ink tank IT has a fibrous or porous ink absorber for holding ink, and the ink absorber holds ink.

Several embodiments using the printing apparatus with the above arrangement as a common embodiment will be described.

<First Embodiment>

Figure 3:
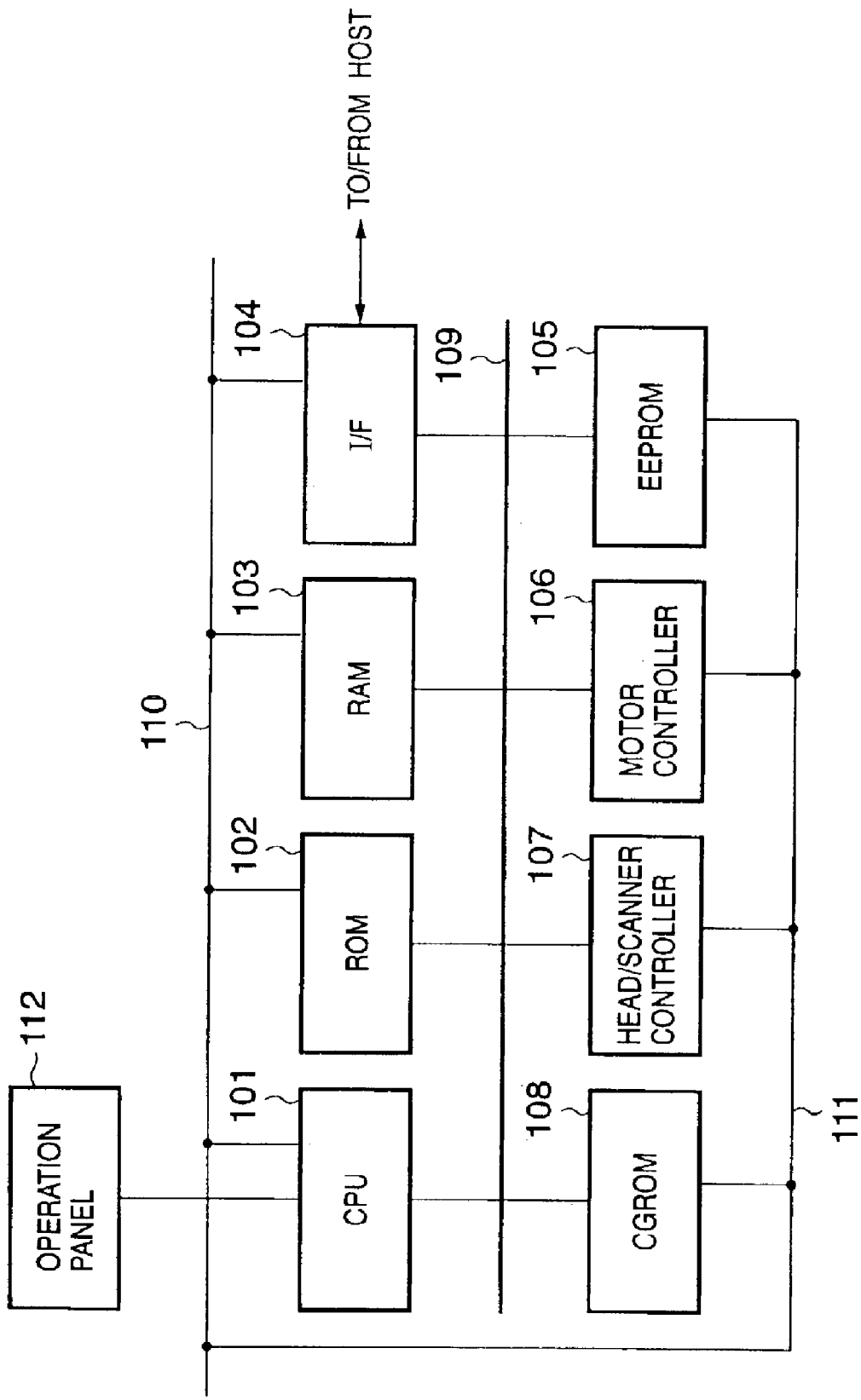
FIG. 3 is a block diagram showing the control arrangement of the printing apparatus shown in FIG. 1.

FIG. 3 is a block diagram showing the control arrangement of the printing apparatus shown in FIG. 1.

In FIG. 3, a CPU 101 executes reception of print data transferred from the host, generation of a print signal based on the received data, driving control of a carriage motor and conveyance motor, discharge control of a printhead IJH, analysis of a command transferred from the host, and print control including various settings by input from an operation panel.

A ROM 102 stores a control program for driving the printing apparatus, various fixed-value data (e.g., a table for driving the carriage motor and conveyance motor), and the like. The CPU 101 reads out the control program and data from the ROM 102, and executes print control. Some of the fixed-value data read out from the ROM 102 are directly used as initial values, whereas some of the data are mapped in a RAM 103, processed by the CPU 101, and then used. Font data used to generate print data on the basis of received data are stored in a CG-ROM 108. If necessary, designated font data is read out by the CPU 101, mapped in the RAM 103, and generated as print data.

Font data changes in built-in font data amount. and built-in typeface depending on the model of the printing apparatus, and requires different capacities.

In the printing apparatus according to the first embodiment, font data is one Mincho font.

A result of modifying the above-described font data by a designated modification method is mapped in the RAM 103, and used as character data. This also applies to image data. The CPU 101 maps print data received from the host in an area of the RAM 103 that corresponds to a designated printing position, and uses the mapped data as image data. The RAM 103 is also used as a work area necessary to execute a program or a reception buffer serving as a temporary storage area for data received from the host via an interface (I/F) 104.

The interface (I/F) 104 is connected to the host (not shown), and used to receive print data and control information such as a print instruction command. When a scanner (not shown) is mounted on a carriage HC of the printing apparatus instead of the printhead IJH and scans an image, the interface (I/F) 104 is used to transmit the scanned image data to the host. Note that the first embodiment employs an IEEE 1284-compliant interface (I/F), but may use another interface such as a USB interface or IEEE 1394 interface. In any case, the interface (I/F) can perform bi-directional communication in order to transfer not only data and information from the host but also transfer the status of the printing apparatus to the host.

A head/scanner controller 107 controls the operation of the printhead IJH or scanner mounted on the carriage HC under an instruction from the CPU 101.

An EEPROM 105 stores the setting status of the printing apparatus, and pieces of information such as the number of print sheets and the remaining ink amount. As the status of the printing apparatus, pieces of information such as the type of font, available paper type, and automatic power-ON/OFF are stored.

A motor controller 106 is used to drive the carriage motor which reciprocally scans in the main scanning direction the carriage HC which holds the printhead IJH in printing on a printing medium or the carriage HC which holds the scanner in scanning an image printed on a printing medium. The motor controller 106 is also used to drive the conveyance motor which conveys a printing medium in accordance with the progress of image printing or image scanning. The carriage motor and conveyance motor are independently operable. In general printing operation, the motor controller 106 drives the carriage motor. After the carriage scans the same region of the printing medium once or a plurality of number of times, the motor controller 106 drives the conveyance motor to convey the printing medium by a predetermined amount.

The CPU 101 controls the motor controller 106 so as to perform printing by using the uniform-velocity region of the carriage HC.

These building elements are connected to each other via a bus line 109 including data and address buses, and transfer data and control information. The CPU 101 uses the bus line 109 to control the building elements.

Reference numerals 110 and 111 denote power supply lines to the building elements; and 112, an operation panel which includes a switch for inputting an instruction by the user to the printing apparatus, and a display for displaying various messages from the printing apparatus.

A printing method in the first embodiment that is adopted in the printing apparatus having the above arrangement will be explained.

Figure 4:
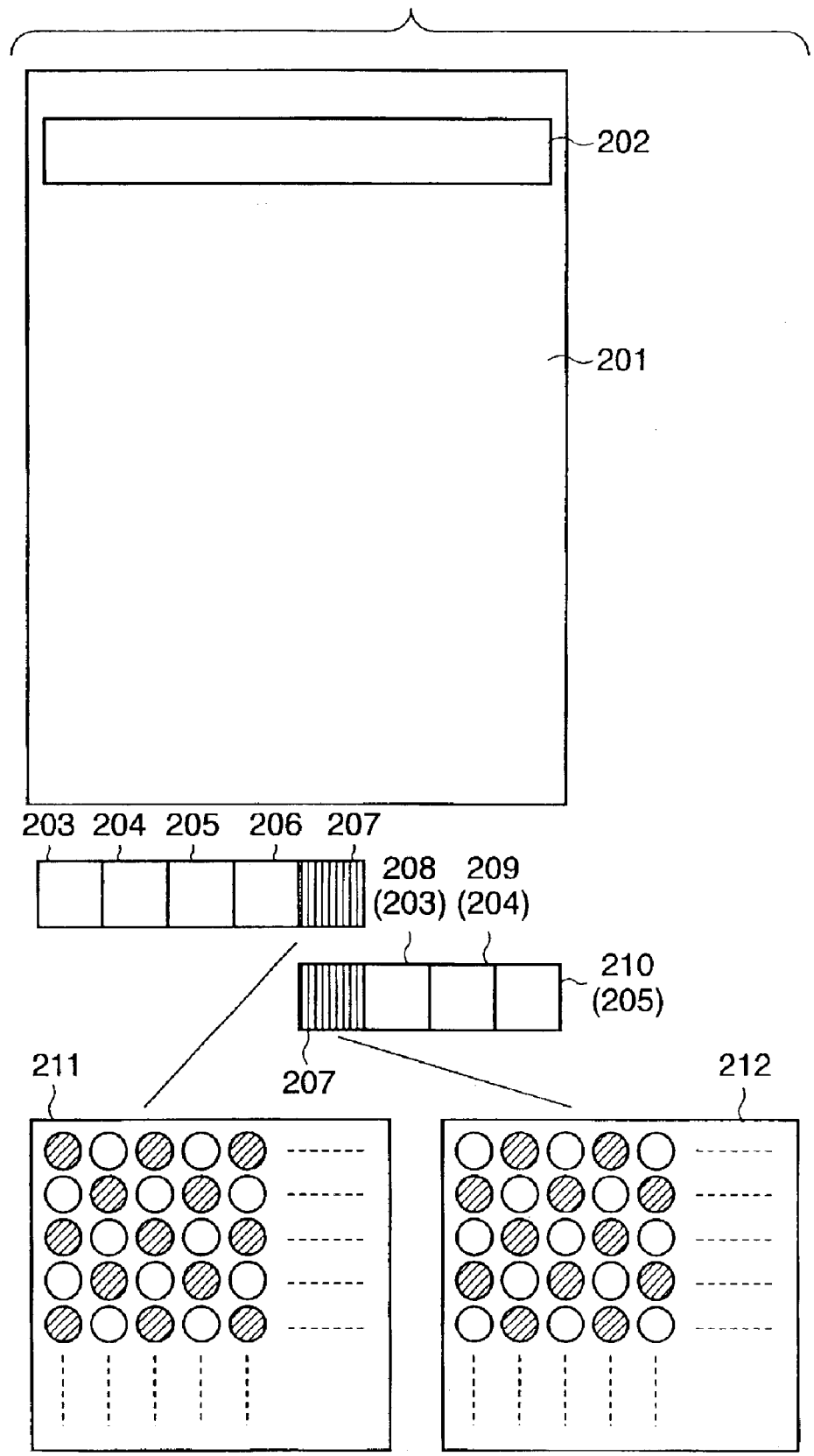
FIG. 4 is a view for explaining a method of printing on one page of a printing medium.

FIG. 4 is a view for explaining a method of printing on one page of a printing medium. Assume that the printing apparatus of the first embodiment can print data at a resolution of 600 dpi.

In FIG. 4, reference numeral 201 denotes a printing medium such as paper; and 202, a printing region where data is printed by one scanning of the printhead IJH. The longitudinal direction of the printing medium 201 is a conveyance direction (sub-scanning direction) in which the printing medium is conveyed, and the lateral direction is a direction (main scanning direction) in which the printhead is scanned. The longitudinal size of the printing region 202 corresponds to the printing width (number of print elements or nozzles) of the printhead IJH.

The printhead IJH moves in the main scanning direction, and when reaching a position represented by print data, discharges ink from a designated nozzle to print an image on a printing medium.

In the first embodiment, an A4-size printing medium is perpendicularly set in the printing apparatus, and data is printed at a resolution of 600 dpi.

Under these conditions, the printing apparatus is equipped with a data buffer which stores more than half (⅝) the amount of print data necessary for printing by one scanning of the printhead IJH. The data buffer is divided into five blocks, and has a ring buffer structure in which the five blocks (each block may be referred to as "data frame" hereinafter) are cyclically used. The print data amount printed in the entire A4-size width by one scanning of the printhead IJH corresponds to a print data amount of eight blocks. In other words, one block stores data of a region obtained by dividing one printing/scanning region into eight portions. One block corresponds to about 1 inch in conversion into the printing width of a printing sheet, and about 600 dots in conversion into the number of print dots. That is, the width of one block of the data buffer corresponds to about 600 dots.

If the data buffer fully stores print data, blocks 203 to 207 can be printed in corresponding regions by the first scanning in terms of the capacity, as shown in FIG. 4.

However, the first embodiment executes the following print control. This control is repetitively performed for printing on one page of a printing medium. For descriptive convenience, only printing in the printing region 202 will be explained.

That is, printing is controlled such that print data stored in the blocks 203 to 206 are completely printed by one scanning of the printhead IJH, but print data stored in the fifth block (i.e., the block 207) is not printed by one scanning of the printhead IJH. As represented by 211 in FIG. 4, print data stored in the block 207 is sampled to a zigzag pattern at a ratio of 50%. By the first scanning, only print data represented by a shaded circle (●) are printed. Data is sampled using a predetermined mask ROM or the like.

As for the blocks 203 to 206, every time printing of each block is completed by scanning the printhead IJH, the data storage area is released and stores the next print data (print data corresponding to the remaining region of the printing region 202). As shown in FIG. 4, print data are mapped in blocks 208 to 210. Note that the data buffer has a ring buffer structure composed of five blocks, as described above. The blocks 208 to 210 have the same memory amounts as those of the blocks 203 to 205.

As for the block 207, 50% of stored print data is printed at the same time as printing using the blocks 203 to 206 in the first scanning of the printhead. Printing of the remaining print data is suppressed.

In the next scanning of the printhead, printing is done using the remaining half print data stored in the block 207 and print data stored in the blocks 208 to 210, completing printing in the printing region 202. At this time, as represented by 212 in FIG. 4, printing is performed using the remaining half print data represented by a shaded circle (⊘) stored in the block 207. As for the blocks 208 to 210, all the print data are printed.

The printing medium is conveyed in the sub-scanning direction by the printing width of the printhead IJH, and the above processing is repeated.

Figure 5:
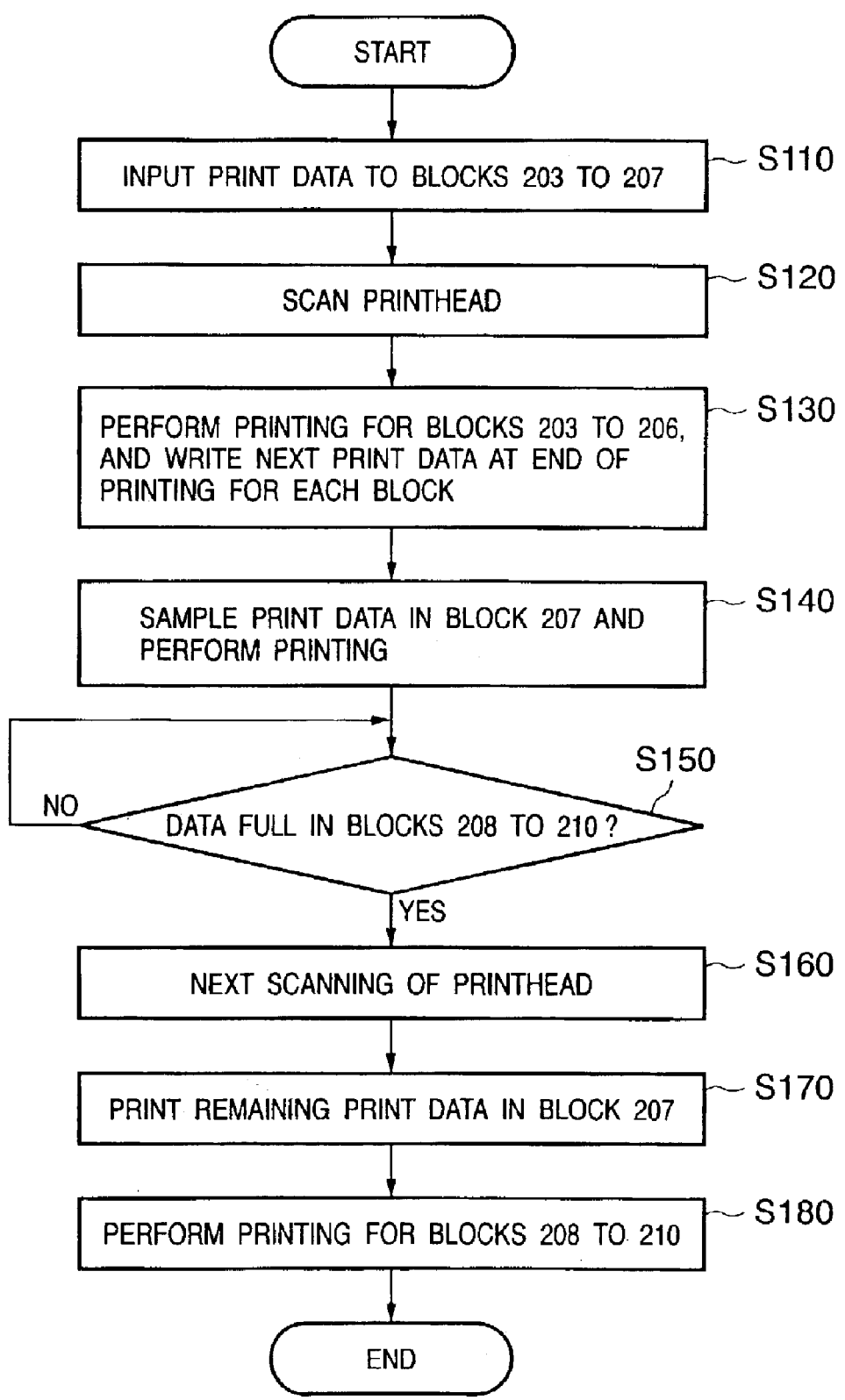
FIG. 5 is a flow chart showing print control in a printing region 202.

This processing is summarized to a flow chart shown in FIG. 5.

FIG. 5 is a flow chart showing print control in the printing region 202. This print control is performed by executing a control program stored in the ROM by the CPU 101.

In step S110, print data are mapped in the blocks 203 to 207. In step S120, the printhead IJH is scanned. In step S130, printing is performed using all print data in the blocks 203 to 206. Every time printing of each block is completed, the storage area is released, and the next print data is mapped.

In step S140, print data stored in the block 207 is sampled, and printing is done using 50% of the print data.

In step S150, the processing waits until the printhead is completely scanned and returns to the home position, and print data are completely mapped in the blocks 208 to 210. Thereafter, the processing advances to step S160 to scan the printhead IJH again.

In step S170, printing is performed using the remaining print data in the block 207. At the end of printing, the storage area of the block 207 is released and waits for mapping of the next print data. In step S180, printing is performed using all print data in the blocks 208 to 210. Every time printing of each block is completed, the storage area is released and waits for mapping of the next print data.

Figure 6:
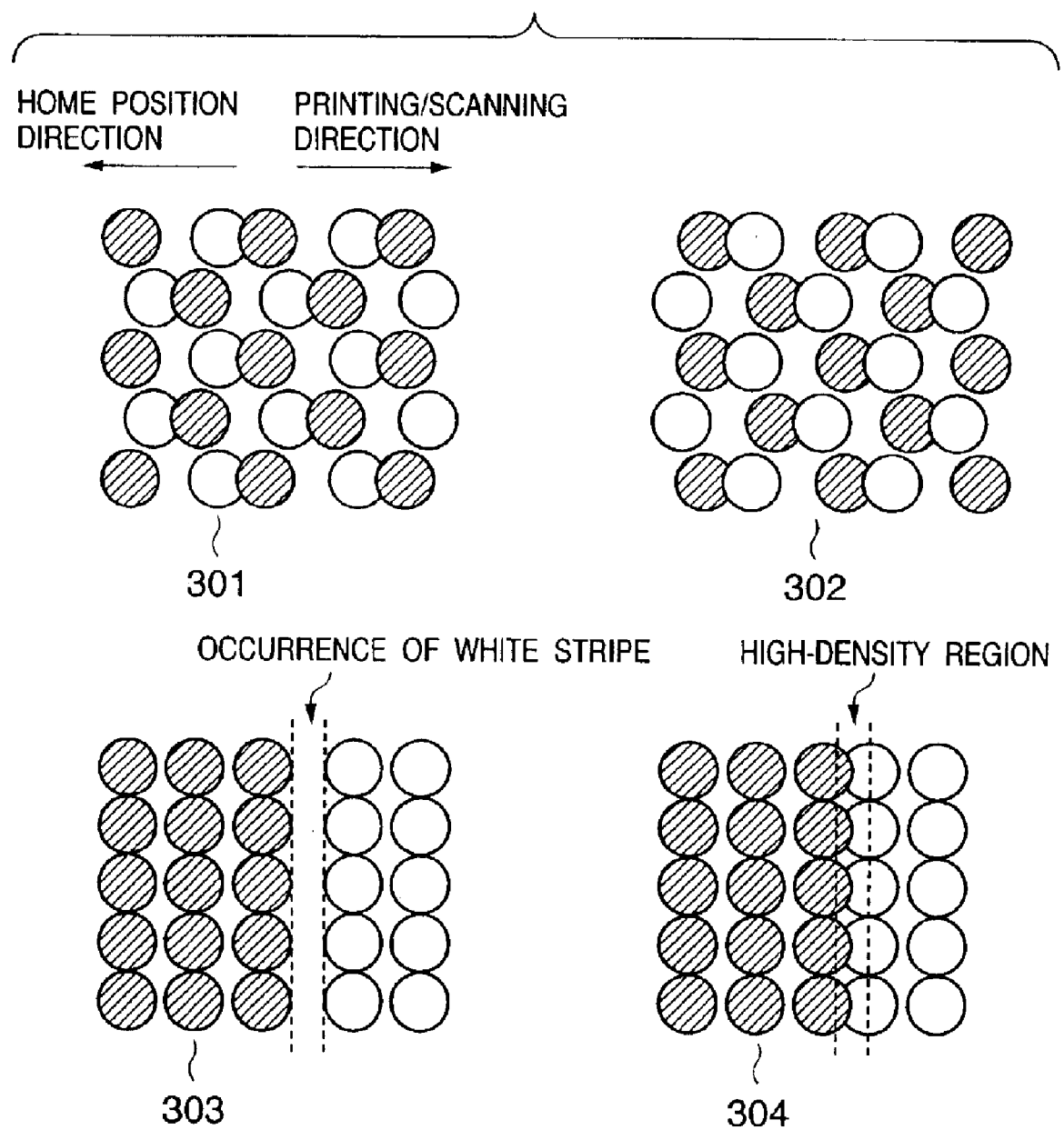
FIG. 6 is a view showing a comparison between a result printed by conventional print control and a result printed by print control according to the embodiment of the present invention.

FIG. 6 is a view showing a comparison between a result printed by the prior art and a result printed by the above-described print control.

In FIG. 6, reference numerals 301 and 302 denote printing results using the printing apparatus according to the first embodiment; and 303 and 304, printing results according to the prior art.

The prior art in this case is print control of performing printing up to a printable position by using all print data stored in the data buffer for the first scanning of the printhead, and performing printing by using print data mapped in the data buffer for the next scanning.

This will be explained in an application to the data buffer shown in FIG. 4. Printing is done using all print data stored in the blocks 203 to 207 in the first scanning of the printhead IJH. In the next scanning, printing is done using all print data stored in the blocks 208 to 210.

The example of FIG. 6 illustrates the printing result of part of a region corresponding to the final block, i.e., block 207 of the data buffer in one scanning/printing of the printhead.

In 301 to 304 of FIG. 6, ⊘ represents each dot printed by the first scanning, and ○ represents each dot printed by the second scanning.

The printing result 301 in FIG. 6 exhibits an example when printing by the second scanning shifts towards the printing/scanning direction from printing by the first scanning in printing by the printing apparatus according to the first embodiment. The printing result 302 in FIG. 6 exhibits an example when printing by the second scanning shifts toward the home position of the printhead from printing by the first scanning.

Note that FIG. 6 is an enlarged view of print dots, and the shift of dots can be recognized. However, this shift cannot be visually recognized in 600-dpi printing.

Similar to the printing result 301 of FIG. 6, the printing result 303 in FIG. 6 exhibits an example when printing by the second scanning shifts toward the printing/scanning direction from printing by the first scanning in printing according to the prior art. As is apparent from FIG. 6, the interval between the third and fourth dot columns is larger than a predetermined amount, and is recognized as a white stripe by the user. That is, occurrence of a white stripe is visually confirmed. Similarly, the printing result 304 of FIG. 6 corresponds to the printing result 302 of FIG. 6, and exhibits an example when printing by the second scanning shifts toward the home position of the printhead from printing by the first scanning. In this case, unlike the printing result 303 of FIG. 6, the third and fourth dot columns overlap each other to increase the density at this position, which is recognized as a black stripe by the user. That is, occurrence of density unevenness is confirmed.

According to the above-described embodiment, even if the ink discharge position changes forward or backward in the scanning direction every scanning of the printhead due to limitations on the precision of the printhead scanning mechanism or the discharge control precision of the printhead, print data of a block corresponding to the final part of printing in the same scanning is sampled and used for printing, and the remaining print data is used for the next printing/scanning, instead of using all print data stored in the data buffer in the same scanning, unlike the prior art. Printing of the same block is distributed to two scanning operations, and the shift of the ink discharge position is scattered.

As a result, the ink discharge position does not uniformly shift. Degradation of the printing image quality can be suppressed to improve the whole image quality.

In the above-described embodiment, print data is sampled by 50% to a zigzag pattern, as shown in FIG. 4. The present invention is not limited to this, and data may be sampled to another sampling pattern.

Figure 7:
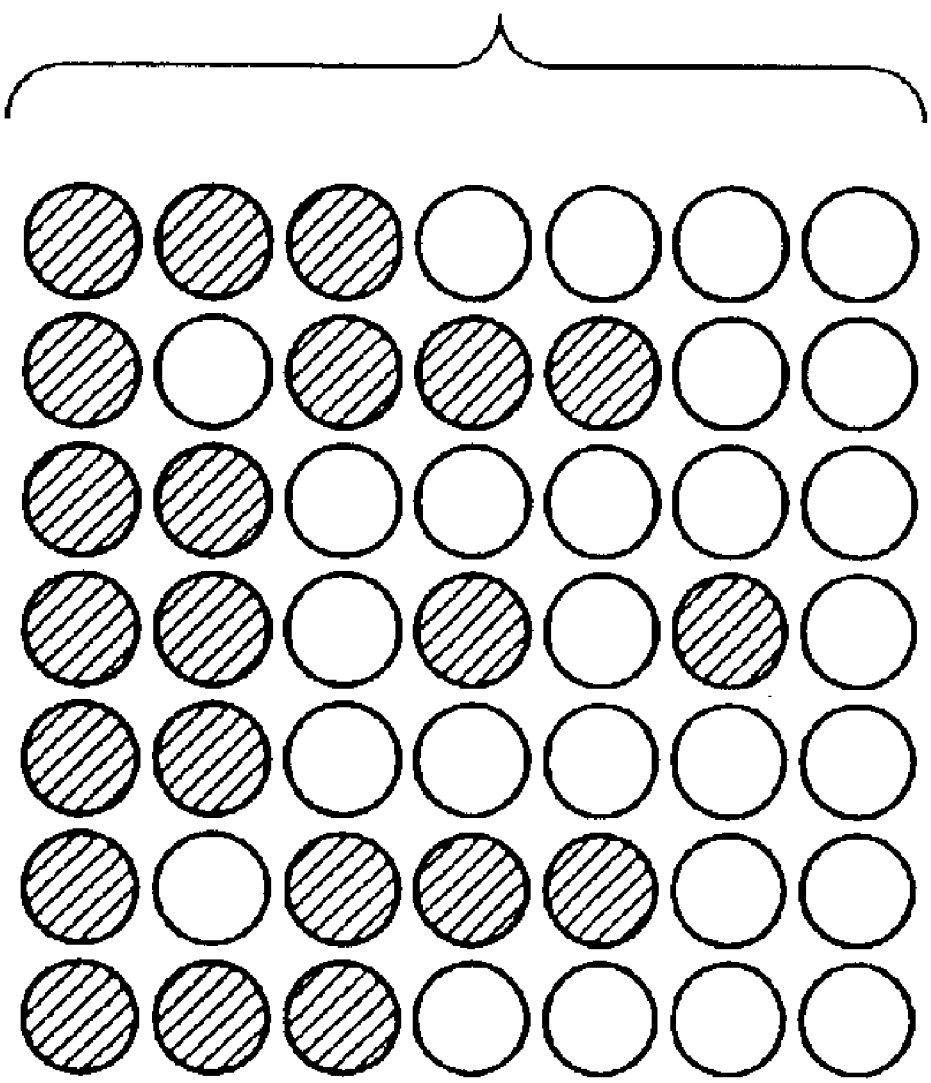
FIG. 7 is a view showing another sampling pattern.

For example, the present invention is more effective in the use of a pattern in which the print dot sampling ratio is slightly changed in the printhead scanning direction between printing by the first scanning and printing by the next scanning, as shown in FIG. 7. In FIG. 7, a shaded circle (⊘) represents each print dot by the first scanning, and a blank circle (○) represents each print dot by the second scanning. The print dot position in each scanning can be arbitrarily set.

Print control using the above-mentioned sampling pattern is advantageous in terms of the cost because this can be easily realized by sampling (thinning out) print data in one block of the data buffer by a pattern stored in a mask ROM or the like.

The above-described embodiment has not particularly specified whether or not printing is color printing. The present invention can also be applied to color printing. In this case, a plurality of different sampling patterns may be employed in correspondence with respective color components of color print data. In this case, a plurality of sampling patterns corresponding to the respective color components are preferably stored in the mask ROM.

Note that, in this embodiment, as shown in FIG. 5, printing is performed as for the blocks 203 to 206 at step S130, the next print data is mapped after printing for these blocks, printing for the block 207 is performed at step S140 after sampling print data of the block 207, printing for the remaining data of the block 207 is performed at step 170 after mapping print data for the blocks 208 to 210.

However, printing for the block 207 may be performed without sampling any print data of the block 207 if print data mapping is smoothly performed after printing for the blocks 203 to 206.

More specifically, when the next print data is mapped after printing for the blocks 203 to 206 in units of blocks, if the print data mapping into the block 208 is completed before start of printing for the block 207, printing for the block 207 may be performed without sampling any print data from the block 207 and print data of the next block 208 may be sampled.

In other words, if print data mapping smoothly goes on, printing may be performed by using all print data mapped into blocks. On the other hand, however, if the print data mapping does not smoothly go on, print data in a block immediately before a block to which print data has not been mapped yet is sampled and then used for printing. And, after completion of mapping print data in the next block, the remaining print data is used for sampling and printing operation proceeds to the next block.

<Second Embodiment>

[Control Arrangement (FIG. 8)]

Figure 8:
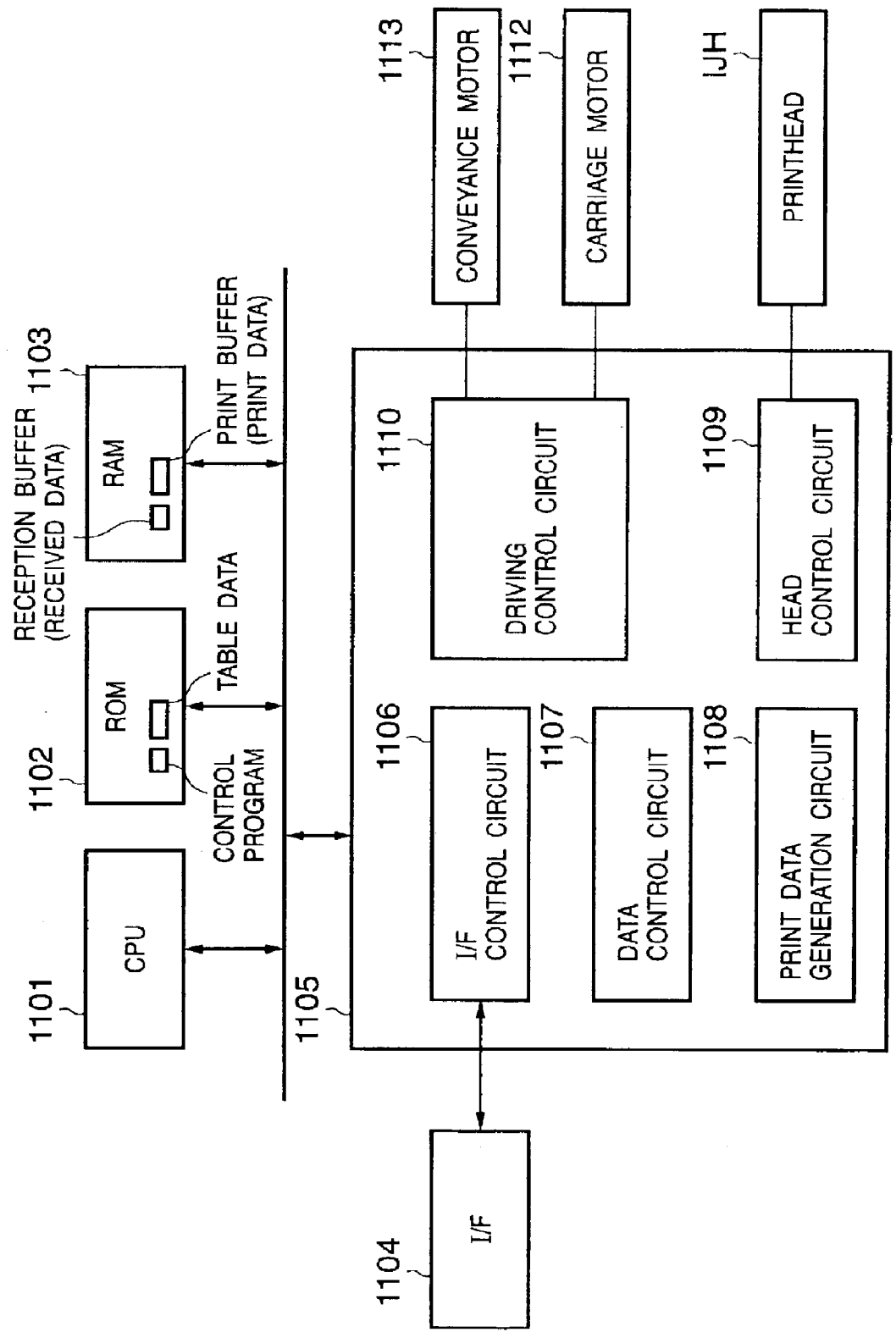
FIG. 8 is a block diagram showing the schematic arrangement of an inkjet printing apparatus according to a second embodiment of the present invention.

FIG. 8 is a block diagram showing a control arrangement of a printing apparatus according to the second embodiment.

In FIG. 8, a CPU 1101 reads out a control program, another table data, and the like from a ROM 1102, and executes them. Data which is received from a host (not shown) via an interface (I/F) 1104 and stored in the reception buffer of a RAM 1103 is read out. Print data processed and generated by a print data generation circuit 1108 included in an ASIC 1105 is stored in the print buffer of the RAM 1103.

The ASIC 1105 comprises an interface control circuit 1106 which exchanges data with the host (not shown) via the interface 1104, a data control circuit 1107 which controls read/write of data from/in the reception buffer and print buffer within the RAM 1103, the print data generation circuit 1108 which generates print data according to the second embodiment, a head control circuit 1109 which controls data transfer of generated print data to a printhead IJH and discharge of ink from the printhead IJH, and a driving control circuit 1110 which controls driving of a carriage motor 1112 for scanning a carriage HC holding the printhead IJH and a conveyance motor 1113 for supplying and discharging a printing medium.

[Image Printing Operation of Inkjet Printing Apparatus (FIG. 9)]

Figure 9:
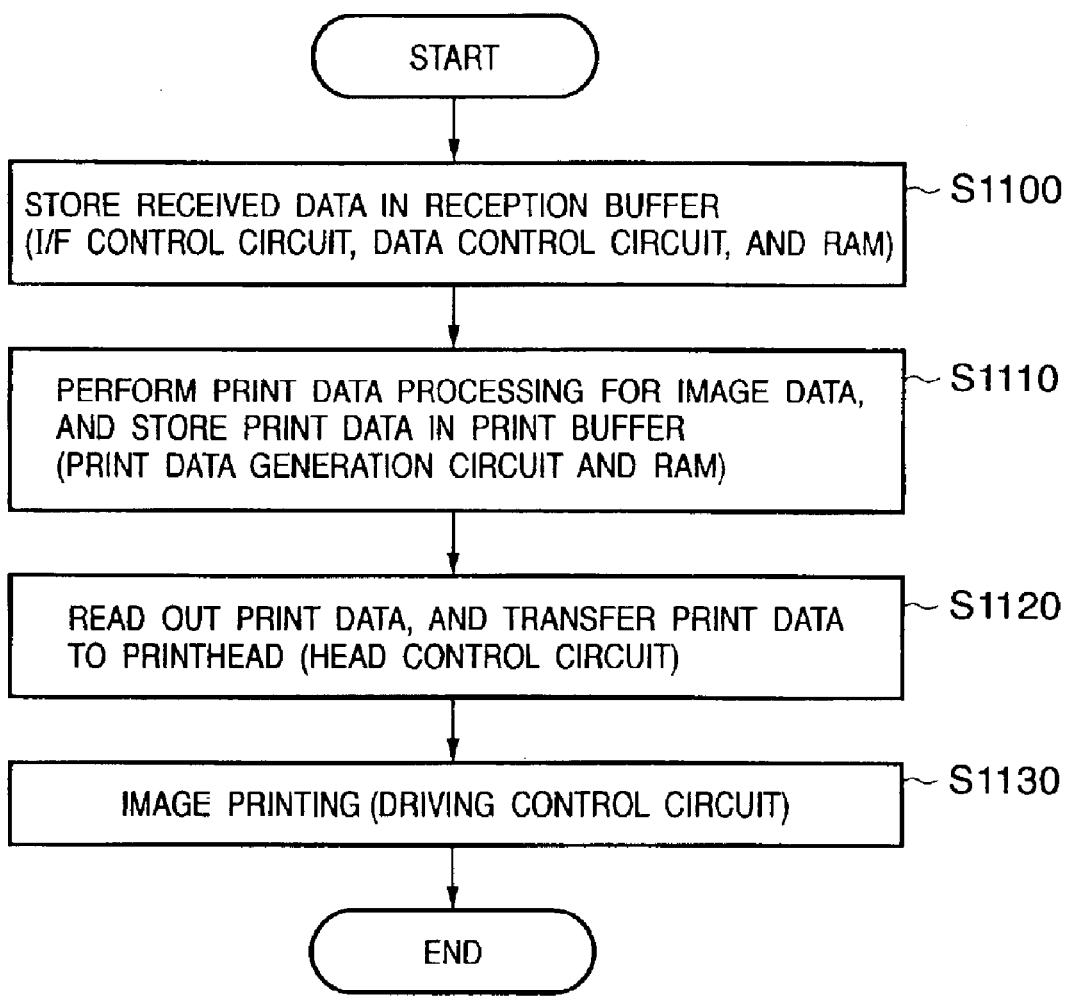
FIG. 9 is a flow chart for explaining image printing processing of the inkjet printing apparatus.

Image printing operation performed under the control of the CPU 1101 on the basis of a control program stored in the ROM 1102 will be explained with reference to FIG. 9.

In step S1100, data containing image data is received from the host (not shown) via the interface 1104. The data control circuit 1107 in the ASIC 1105 temporarily stores the received data in the reception buffer allocated in the RAM 1103 via the interface control circuit 1106.

In step S1110, the print data generation circuit 1108 analyzes the command of the received data stored in the reception buffer, and performs print data processing for the image data contained in the received data. The generated print data is accumulated in the print buffer allocated in the RAM 1103.

In step S1120, after a necessary amount of print data is accumulated in the print buffer, the head control circuit 1109 reads out the print data from the print buffer at a predetermined timing, and transfers the print data to the printhead IJH.

In step S1130, the driving control circuit 1110 is controlled to drive the carriage motor 1112. The printhead IJH is scanned in a direction (main scanning direction) perpendicular to the conveyance direction (sub-scanning direction) of a printing medium such as a printing sheet. The head control circuit 1109 is controlled to supply a driving pulse to the printhead IJH, thereby printing an image on the printing medium, thus completing image printing by the width of the printhead IJH.

At the end of image printing by one scanning, the driving control circuit 1110 is controlled to drive the conveyance motor 1113 so as to convey the printing medium in the conveyance direction by the printhead width.

Processing by the print data generation circuit 1108 when data transfer from the host (not shown) to the inkjet printing apparatus is left undone during the above-described image printing operation will be explained with reference to FIGS. 10 to 15.

[Print Data Generation Circuit (FIG. 10)]

Figure 10:
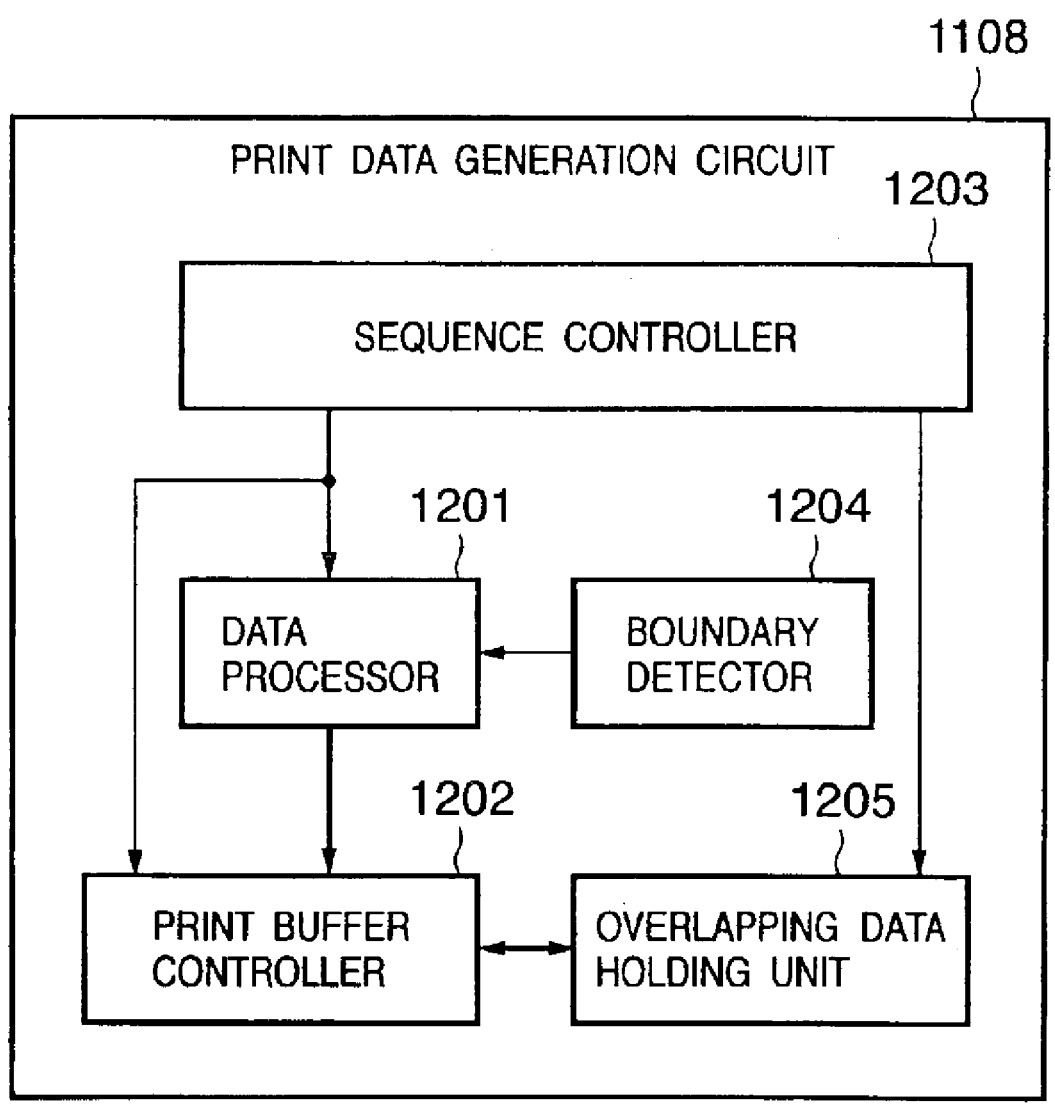
FIG. 10 is a block diagram showing the arrangement of a print data generation circuit.

FIG. 10 is a block diagram showing the arrangement of the print data generation circuit 1108.

In FIG. 10, reference numeral 1201 denotes a data processor which generates image data to be written in the print buffer; 1202, a print buffer controller which controls a write address or the like to the print buffer; and 1203, a sequence controller which controls the overall print data generation circuit 1108 and determines whether or not print data can be generated without any delay.

For example, when the time between reception of a data frame (final data frame transmitted immediately before occurrence of a time delay) and reception of the next data frame (data frame first transmitted after occurrence of the time delay) exceeds a predetermined time set in advance, images printed by these data frames are determined to have a time delay.

It is also possible to compare a received data amount and print data amount which are accumulated in the RAM 1103 and determine on the basis of the comparison result whether or not print data is generated with a delay.

In a case where print data has not been stored into the next data frame yet, it may be determined that print data generation has been delayed.

Reference numeral 1204 denotes a boundary detector which, when data transfer from the host (not shown) is left undone and a time difference occurs in image printing, detects the boundary (e.g., between 405 and 406 in FIG. 12A to be described later) between two data frames having the time difference (a final data frame transmitted immediately before occurrence of the time delay and a data frame first transmitted after occurrence of the time delay), and when the time difference occurs at the boundary between the data frames, manages a data overlapping portion to be described later.

Reference numeral 1205 denotes an overlapping data holding unit which holds part of overlapping data generated by overlapping data processing to be described later for data frames having a time difference. Part of overlapping data held by the overlapping data holding unit 1205 is added to the head portion of a data frame first transmitted after occurrence of a time delay.

[Processing by Print Data Generation Circuit (FIG. 11)]

Figure 11:
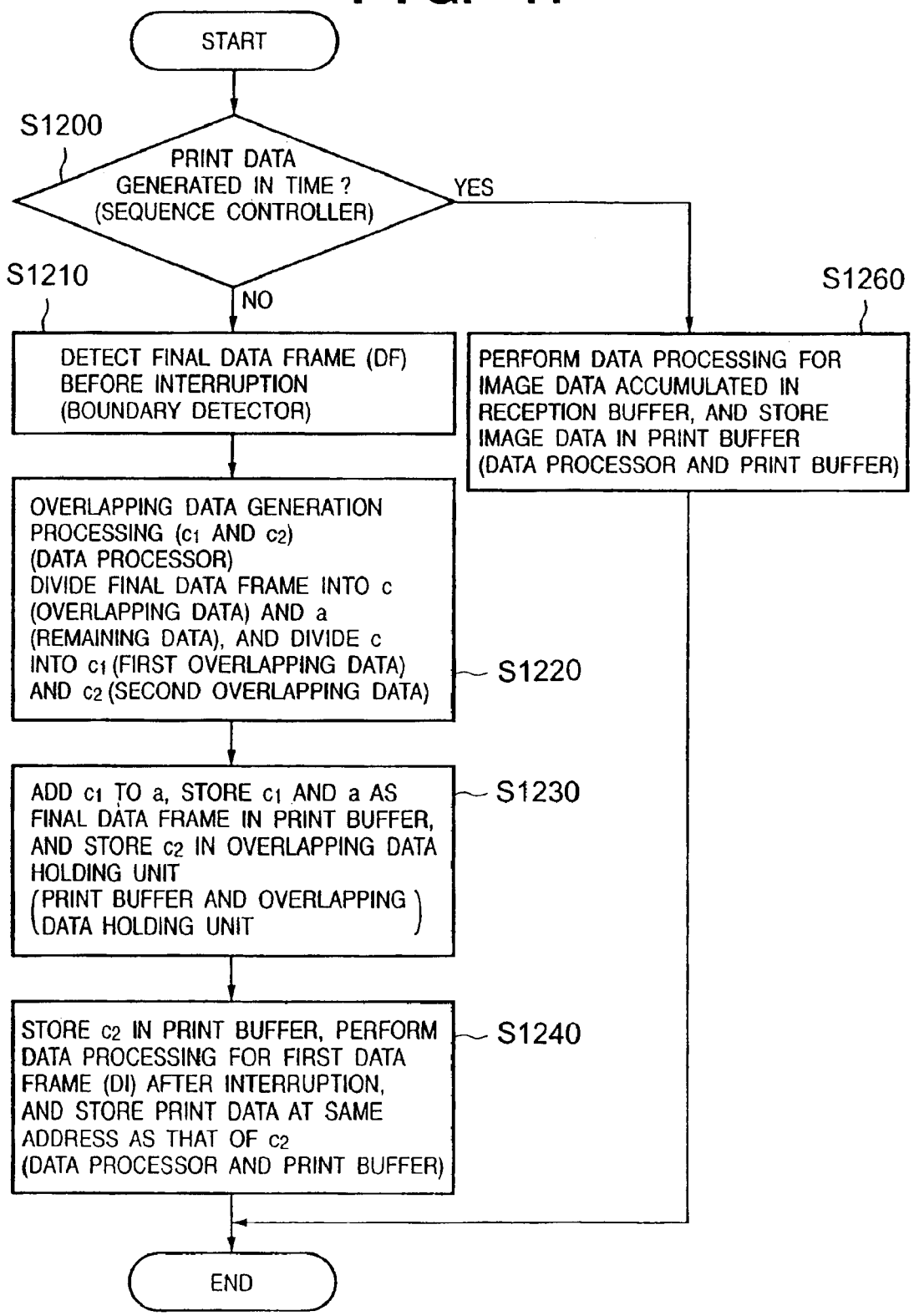
FIG. 11 is a flow chart for explaining overlapping data generation processing according to the second embodiment of the present invention.
Figure 12:
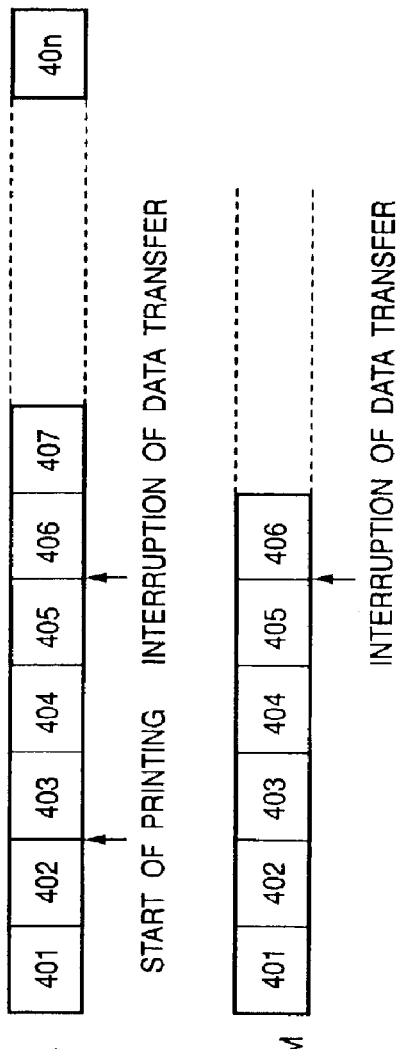
FIGS. 12A and 12B are schematic views showing an example of an image printed on a printing medium according to the second embodiment of the present invention when data transfer is left undone during image printing and a time difference is generated in image printing.

FIG. 11 is a flow chart showing processing executed by the print data generation circuit 1108.

In step S1200, the sequence controller 1203 compares a received data amount accumulated in the reception buffer within the RAM 1103 and a print data amount accumulated in the print buffer. The sequence controller 1203 determines whether or not there is a delay in generating print data necessary to continue image printing operation by one scanning.

If it is determined that there is no delay in generating print data, the processing advances to step S1260. The data processor 1201 performs data processing for image data contained in received data accumulated in the reception buffer, and generates print data. The data processor 1201 stores the print data in the print buffer, and ends a series of operations.

On the other hand, if it is determined at step S1200 by the sequence controller 1203 that there is a delay in generating print data, the processing advances to step S1210. The boundary detector 1204 detects the final data frame (DF) transmitted before interruption of image printing (immediately before occurrence of a time delay).

The processing advances to step S1220. The data processor 1201 executes overlapping data generation processing on the basis of the final data frame (DF) transmitted immediately before occurrence of the time delay. That is, the data processor 1201 divides the final data frame (DF) into c (overlapping data) and a (data other than overlapping data). The data processor 1201 further divides c (overlapping data) into $c_1$ (first overlapping data) and $c_2$ (second overlapping data), thus generating the overlapping data $c_1$ and $c_2$.

The processing advances to step S1230. Of the two overlapping data $c_1$ and $c_2$ generated by overlapping data generation processing, the first overlapping data $c_1$ is stored in the print buffer together with a (data other than overlapping data) of the final data frame (DF) transmitted immediately before occurrence of the time delay. The second overlapping data $c_2$ is held by the overlapping data holding unit 1205.

The processing advances to step S1240. The print buffer control circuit 1202 stores in the print buffer the second overlapping data $c_2$ held by the overlapping data holding unit 1205. The print buffer control circuit 1202 performs data processing for image data of a data frame (DI) first transmitted after occurrence of the time delay, thereby generating print data. The print buffer control circuit 1202 stores the print data in the print buffer at the same address as that of the second overlapping data $c_2$ (i.e., adds $c_2$ to the head portion of DI), and ends a series of operations.

[Image Printing Processing (FIGS. 12A to 15)]

Image printing processing executed by the print data generation circuit 1108 will be described in detail below with reference to FIGS. 12A to 15.

(1) Normal Image Printing (FIGS. 12A and 12B)

FIG. 12A is a view showing an example of data transfer from the host (not shown) to the inkjet printing apparatus. Image data by one scanning of the printhead is divided into n data frames, and transmitted as data frames 401, 402, . . . , 40n. Data received by the inkjet printing apparatus is temporarily stored in the reception buffer assigned within the RAM 1103.

The print data generation circuit 1108 uses the data processor 1201 to process image data contained in the received data accumulated in the reception buffer, thus generating print data. The print data generation circuit 1108 writes the print data sequentially from the data frame 401 in the print buffer within the RAM 1103.

For example, image printing by one scanning with the printhead width starts when data up to the data frame 402 are stored in the print buffer. As shown in FIG. 12B, an image is printed sequentially from the data frame 401 on a printing medium. Image data accumulated in the memory area is decreased with the progress of image printing. Data frames sequentially transmitted from the host are stored in the memory area while the contents of the memory area of the inkjet printing apparatus are sequentially rewritten.

(2) Image Printing When Data Transfer is Left Undone (FIGS. 12A to 15)

Processing by the print data generation circuit 1108 when the inkjet printing apparatus receives data up to the data frame 405 shown in FIG. 12A and then data transfer from the host (not shown) is left undone will be explained.

If data transfer from the host (not shown) is left undone upon reception of the data frames up to the data frame 405 shown in FIG. 12A and the data frame 406 cannot be received, print data is not timely generated from the data frame 406 though actual printing operation goes on. The sequence controller 1203 determines that a time difference occurs between images printed by the data frames 405 and 406.

If the sequence controller 1203 detects that the time difference occurs at the boundary between the data frames 405 and 406, the data processor 1201 executes for the data frames 405 and 406 the following processing of generating overlapping data. Note that the following overlapping data generation is performed only when a time difference occurs between data frames.

Figure 13:
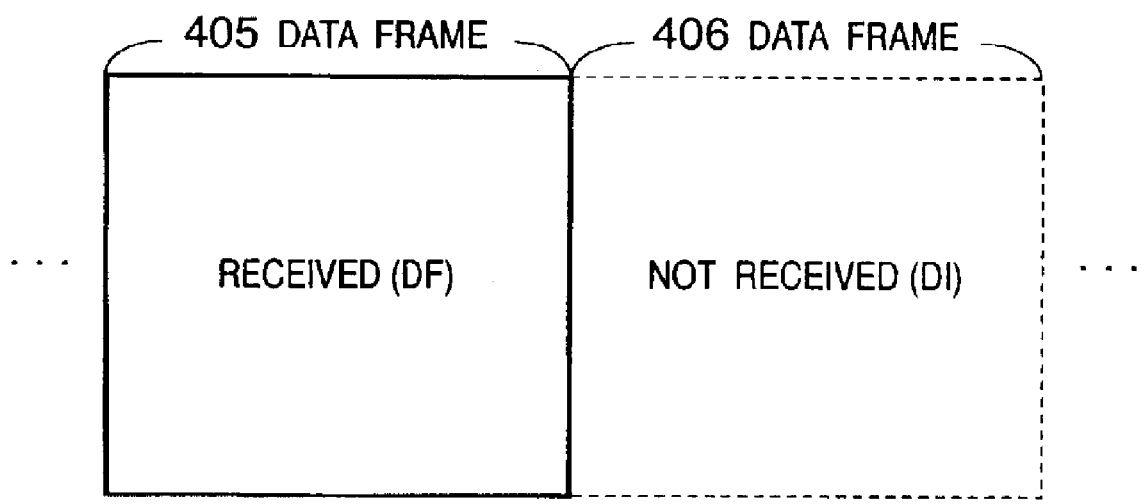
FIG. 13 is a view showing the final data frame transmitted immediately before occurrence of a time delay and a data frame first transmitted after occurrence of the time delay.

FIG. 13 is a view showing a state in which transmission of the data frame 406 from the host (not shown) delays upon reception of the data frames up to the data frame 405 and the sequence controller 1203 determines that data transfer is left undone. That is, the data frame 405 is the final data frame (DF) transmitted immediately before occurrence of a time delay. The data frame 406 is a data frame (DI) first transmitted after occurrence of the time delay.

Figure 14:
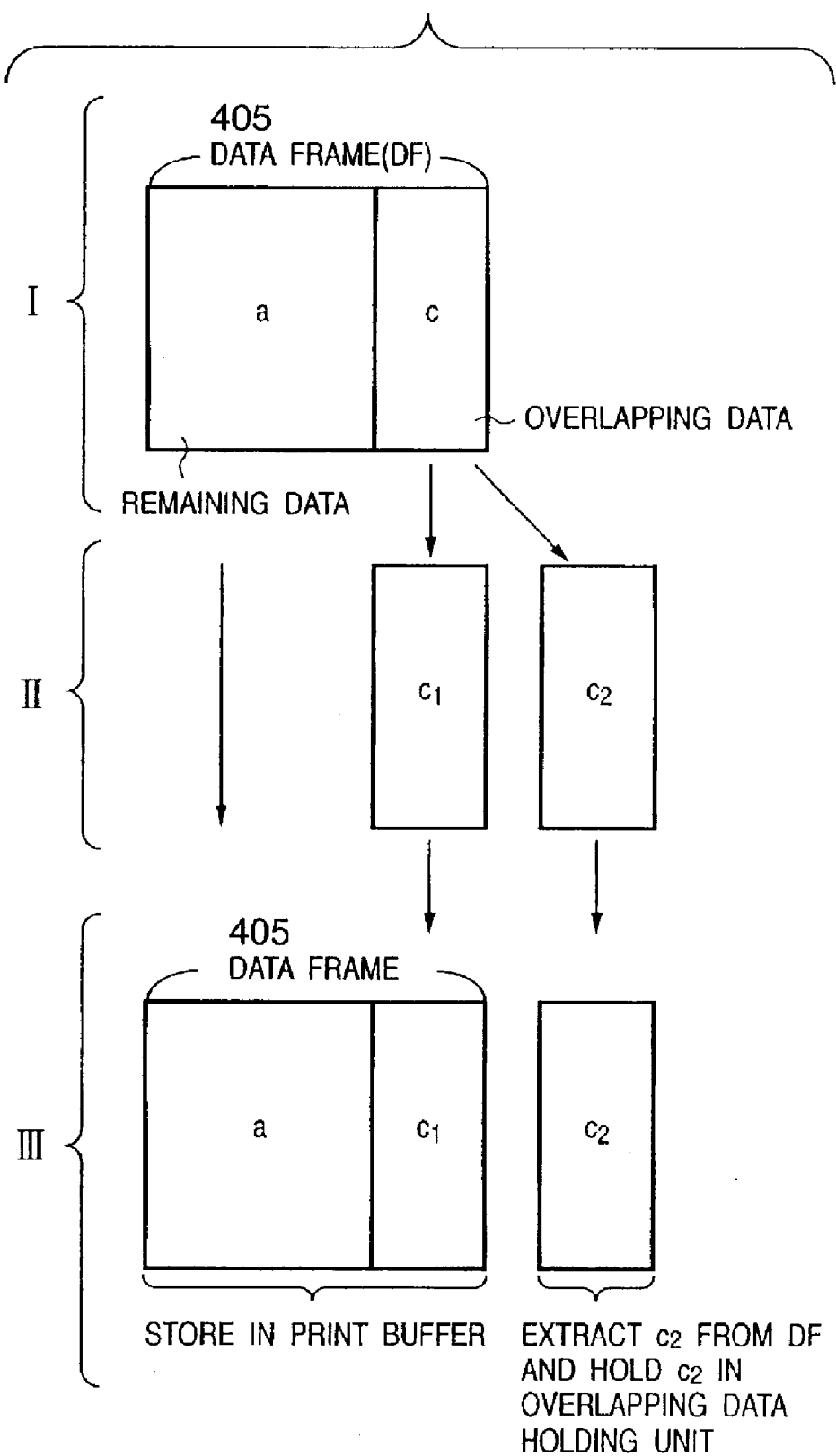
FIG. 14 is a view for explaining processing of generating two overlapping data $c_1$ and $c_2$ from the final data frame transmitted immediately before occurrence of a time delay.

At this time, as represented by I in FIG. 14, the data processor 1201 divides the data frame 405 serving as the final data frame (DF) into c (overlapping data) and a (data other than overlapping data). As represented by II in FIG. 14, the data processor 1201 further divides c (overlapping data) into $c_1$ (first overlapping data) and $c_2$ (second overlapping data), thus generating two overlapping data ($c_1$ and $c_2$).

Of data of the data frame 405, c (overlapping data) is data which is extended to some degree in the carriage scanning direction (main scanning direction). $c_1$ (first overlapping data) is data used for printing immediately before interruption of printing operation, while $c_2$ (second overlapping data) is data used immediately after the restart of printing operation. Both $c_1$ and $c_2$ are data belonging to c, and c is divided into two data by setting data sampled by 50% as $c_1$ and the remaining 50% of data as $c_2$.

Note that the sampling ratio need not always be 50% for both $c_1$ and $c_2$. For example, the sampling ratio may be 40% for $c_1$ and 60% for $c_2$, or 60% for $c_1$ and 40% for $c_2$. Alternatively, the following sampling processing may be done. In any case, since $c_1$ and $c_2$ have complementary relationship with each other, printing is achieved using all data in two printing operations for the same printing region by printing processes before and after interruption of printing operation. Data used in two printing operations for the same printing region is called "overlapping data" in printing processes before and after interruption of printing operation.

As represented by m in FIG. 14, the data processor 1201 extracts only the second overlapping data $c_2$ from the data frame 405. That is, the data processor 1201 stores data a other than overlapping data in the print buffer, stores the first overlapping data $c_1$ at the same address in the print buffer, and stores the extracted second overlapping data $c_2$ in the overlapping data holding unit 1205.

Note that an image immediately before occurrence of the time delay is printed using the data frame 405 ($a+c_1$) obtained by extracting the second overlapping data $c_2$ from the data frame 405. When the image up to the data frame 405 is formed on a printing medium, the printhead IJH halts printing operation and returns to the reference position.

After data transfer from the host (not shown) restarts and data of the data frame 406 and subsequent data frames are received, the data processor 1201 starts processing the data frame 406.

Figure 15:
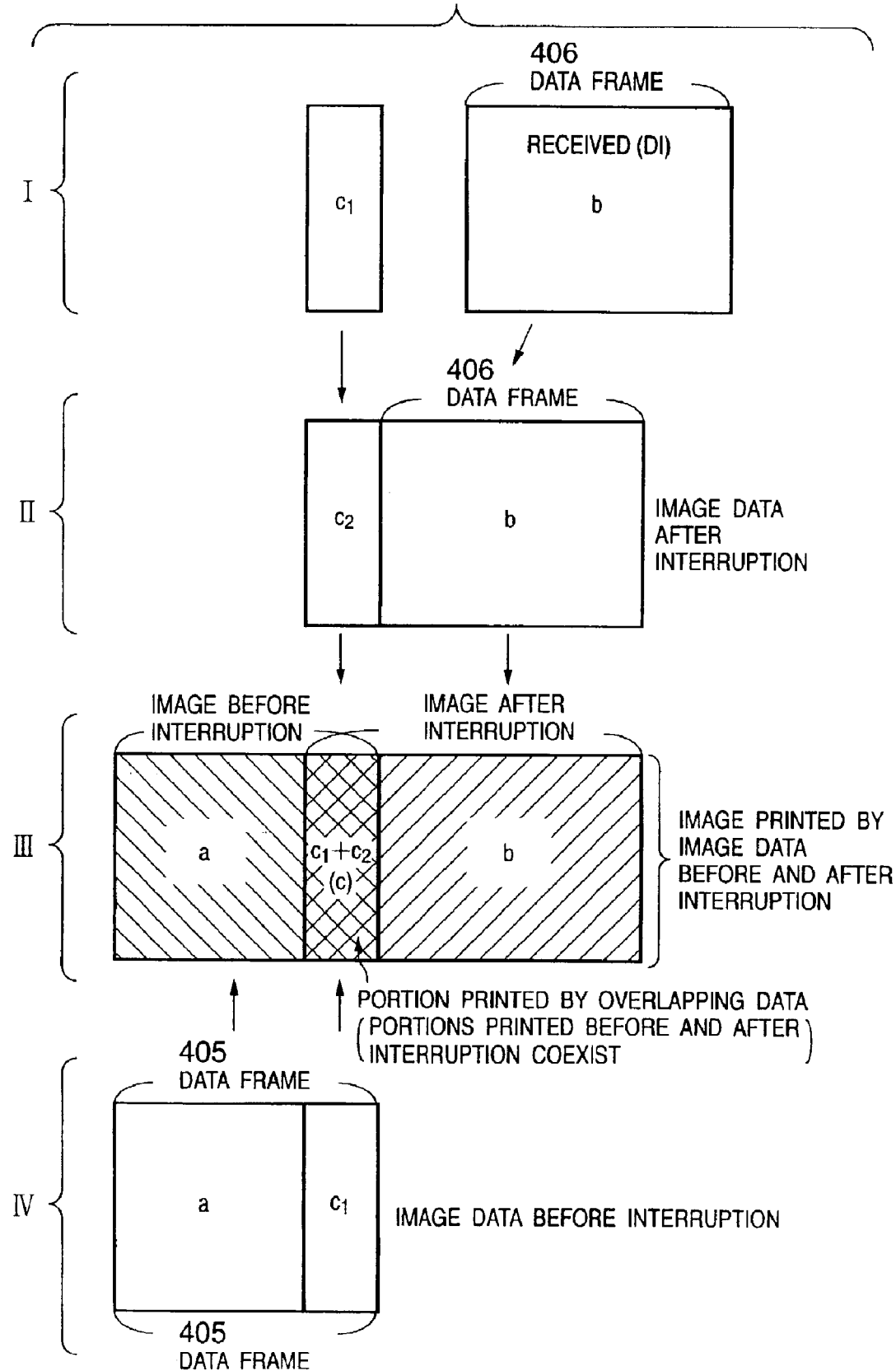
FIG. 15 is a view for explaining processing of adding the overlapping data $c_2$ to the first data frame transmitted immediately after occurrence of a time delay.
Figures 18A, 18B:
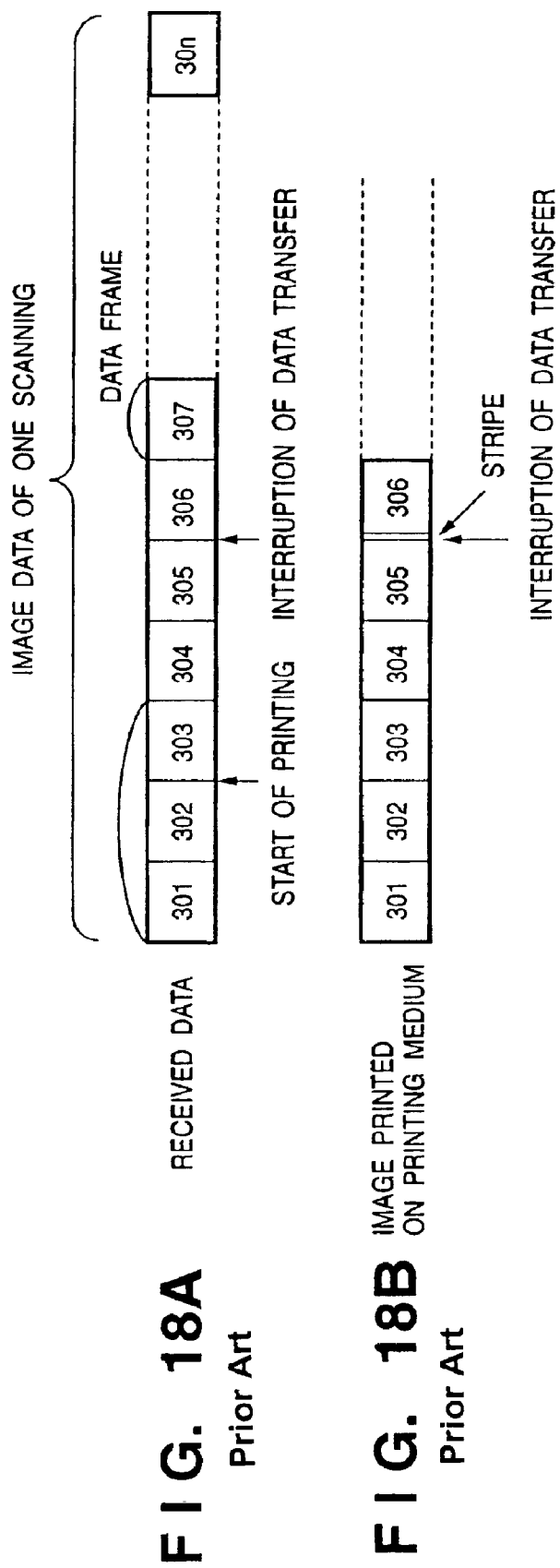
FIGS. 18A and 18B are schematic views showing an example of an image printed on a printing medium in the prior art when data transfer is left undone during image printing and a time difference is generated in image printing.

When the data frame (DI), i.e., data frame 406 first transmitted after occurrence of the time delays is received, as represented by I in FIG., 15, the data processor 1201 adds the second overlapping data $c_2$ extracted from the data frame 405 to the head portion of the data frame 406, as represented by II in FIG. 15.

More specifically, upon reception of the data frame 406, the data processor 1201 writes the second overlapping data $c_2$ held by the overlapping data holding unit 1205 at an address of the print buffer that is designated by the print buffer controller 1202. The data processor 1201 performs data processing for image data of the received data frame 406, generating print data. The data processor 1201 adds the print data at an address subsequent to the address where the second overlapping data $c_2$ is written. As a result, the second overlapping data $c_2$ is added to the head portion of the data frame 406. An image immediately after occurrence of the time delay is printed using the data frame 406 to which the second overlapping data $c_2$ is added.

Note that printing/scanning restarts when a necessary amount of print data of the data frame 406 containing the second overlapping data $c_2$ and subsequent data frames are accumulated in the print buffer. Actual printing operation starts from an interrupted position.

At this time, as represented by III in FIG. 15, a dot portion ($c_1$) printed before interruption and a dot portion ($c_2$) printed after restart coexist by the above-described overlapping data processing at a portion c serving as the boundary between images printed by the data frames 405 and 406. Accordingly, density unevenness due to the printing time difference can be reduced, a conventionally undesirable stripe can be prevented, and a high-quality image can be provided.

(3) Example of Sampling Processing (FIGS. 16A to 17C)

An example of sampling processing used to reduce image degradation caused by density unevenness shown in FIGS. 14 and 15 will be explained with reference to FIGS. 16A to 17C.

General Description of Overlapping Data Sampling Processing (FIGS. 16A to 16C)

Overlapping data sampling processing is generally described with reference to FIGS. 16A to 16C.

FIG. 16A is a view showing the data frame 405 ($a+c_1$) used for printing before interruption of printing operation. FIG. 16B is view showing the data frame 406 to which the second overlapping data $c_2$ is added and is used for printing after interruption of printing. FIG. 16C is a view showing images which are printed and superposed on each other before and after interruption of printing operation.

As shown in FIGS. 16A and 16B, two overlapping data $c_1$ and $c_2$ ($c=c_1+c_2$) obtained by dividing the overlapping data c into two in the region of the overlapping data c described with reference to I and II in FIG. 14, i.e., the first overlapping data $c_1$ used for printing immediately before interruption of printing operation and the second overlapping data $c_2$ used for printing immediately after interruption of printing operation are divided by a predetermined number (in this case, "4") with the same division width, as shown in FIGS. 16A to 16C. Data of the divided regions are respectively sampled at different sampling ratios, generating data groups 601 to 604 and data groups 605 to 608.

Of the data groups 601 to 608, the data groups 601 to 604 form the first overlapping data $c_1$, while the data groups 605 to 608 form the second overlapping data $c_2$. The data groups 601 and 605, data groups 602 and 606, data groups 603 and 607, and data groups 604 and 608 are respectively data used for printing at the same printing position before and after interruption of printing operation. In addition, $c=c_1+c_2$ holds. The sampling ratio for generating each data group is increased or decreased stepwise.

Attention is given to, e.g., the divided data groups 601 and 605. The data group 601 represents that an image is printed using 80% of image data which is sampled by 20%. The data group 605 represents that an image is printed using 20% of image data which is sampled by 80%. Considering image data used for printing before and after interruption of printing operation, $c_1$ (80% after sampling)+$c_2$ (20% after sampling)=c (100%), and all image data are used.

The sampling ratio for the data groups 601 to 604 belonging to the overlapping data $c_1$ used for printing before interruption of printing operation is increased (20% 40% 60% 80%). The sampling ratio for the data groups 605 to 608 belonging to the overlapping data $c_2$ used for printing after interruption of printing operation is decreased (80%→60%→40%→20%).

In other words, the sum ($c_1+c_2$) of corresponding data (e.g., 80% of the data 601 of the first overlapping data $c_1$ after sampling and 20% of the data 605 of the second overlapping data $c_2$ after sampling) contained in data groups of the two divided overlapping data ($c_1$ and $c_2$) is equal to the overlapping data c (100%) by sampling processing described above.

Detailed Example of Overlapping Data Sampling Processing (FIGS. 17A to 17C)

A detailed example of overlapping data sampling processing described with reference to FIGS. 16A to 16C will be described with reference to FIGS. 17A to 17C.

FIGS. 17A to 17C show an example of 100%-duty printing in which the entire overlapping data region c ($c_1+c_2$) is filled with dots (ink droplets are discharged). In FIGS. 17A to 17C, the divided data regions 601 to 608 shown in FIGS. 16A to 16C are explained as regions of 10×10 dots as an example of data generated in 100%-duty printing.

In FIG. 17A, numerals 701 to 704 represent the divided data group regions 601 to 604 of the overlapping data $c_1$ used for printing before interruption of printing operation. In FIG. 17B, numerals 705 to 708 represent the divided data group regions 605 to 608 of the overlapping data $c_2$ used for printing after interruption of printing operation. In FIG. 17C, numerals 709 to 712 represent the sums of divided data groups used for printing before and after interruption of printing operation. That is, numerals 709 to 712 represent final data ($c=c_1+c_2$) in 100%-duty printing that correspond to a region 609 (=601+605), region 610 (=602+606), region 611 (=603+607), and region 612 (=604+608) in FIG. 16C.

The data 701 to 708 shown in FIGS. 17A and 17B are generated by sampling the overlapping data c stepwise at the above-mentioned sampling ratio by the print data generation circuit 1108.

The data group regions 601 to 604 belonging to the first overlapping data c1 used for printing before interruption of printing operation are sampled data, e.g., 80% data 701 (sampling ratio: 20%), 60% data 702 (sampling ratio: 40%), 40% data 703 (sampling ratio: 60%), and 20% data 704 (sampling ratio: 80%), as shown in FIG. 17A.

Similarly, the data group regions 605 to 608 belonging to the second overlapping data $c_2$ used for printing after interruption of printing operation are sampled data, e.g., 20% data 705 (sampling ratio: 80%), 40% data 706 (sampling ratio: 60%), 60% data 707 (sampling ratio: 40%), and 80% data 708 (sampling ratio: 20%), as shown in FIG. 17B.

In this manner, the divided data groups belonging to the first overlapping data $c_1$ used for printing before interruption of printing operation and the divided data groups belonging to the second overlapping data $c_2$ used for printing after interruption of printing operation are generated using complementary sampling ratios. Image degradation can be further prevented by data generation control and printing control which finally form the 100% data 709 to 712 of image data to be originally printed, as shown in FIG. 17C.

Note that sampling processing executed stepwise by the print data generation circuit 1108 for the divided data groups belonging to the first and second overlapping data $c_1$ and $c_2$ is achieved as follows. For example, various mask data with a predetermined division width but different sampling ratios are prepared in advance in the print data generation circuit 1108. The print data generation circuit 1108 performs mask processing using the mask data having different sampling ratios when respectively dividing the first and second overlapping data $c_1$ and $c_2$ into data groups having a predetermined division width.

As described above, according to the second embodiment, when data frames of image data necessary for printing by one scanning of the printhead are sent from the host, whether or not a time difference occurs in printing using the respective data frames is detected. For data frames having a time difference, part of data is divided into two portions. The divided data are controlled to be printed before and after occurrence of the time difference. Dots having the time difference coexist at the boundary between images formed by the data frames having the time difference.

Thus, the printing density difference by the printing time difference is scattered, and density unevenness caused by the printing time difference is reduced. Thus, image degradation can be prevented.

Note that, in the description of the above embodiments, a liquid droplet discharged from the printhead is ink, and the liquid stored in the ink tank is also ink. However, the liquid stored in the ink tank is not limited to ink. For example, the ink tank may store a processing liquid to be discharged onto a print medium so as to improve fixability and water repellency of a printed image or to improve its image quality.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing method, one practiced by use of the basic principle disclosed in, for example, U.S. Pat. Nos. 4,723,129 and 4,740,796 is preferable. The above system is applicable to either one of a so-called on-demand type and continuous type system. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Publication Laid-Open No. 59-123670 which discloses the arrangement using a slot common to a plurality of electrothermal transducers as a discharge portion of the electrothermal transducers, or Japanese Patent Publication Laid-Open No. 59-138461 which discloses the arrangement having an opening for absorbing a pressure wave of heat energy in correspondence with a discharge portion.

In addition, not only a cartridge type printhead, in which an ink tank is integrally arranged on the printhead itself, but also an exchangeable chip type printhead, as described in the above embodiments, which can be electrically connected to the apparatus main unit and can receive an ink from the apparatus main unit upon being mounted on the apparatus main unit, can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a nonuse state and liquefies upon heating may be used. In any case, an ink which liquefies upon application of heat energy according to a printing signal and is discharged in a liquid state, an ink which begins to solidify when it reaches a printing medium, or the like, is applicable to the present invention.

In this case, ink may be situated opposite electrothermal transducers while being held in a liquid or solid state in recess portions of a porous sheet or through-holes, as described in Japanese Patent Publication Laid-Open No. 54-56847 or 60-71260. In the present invention, the above-mentioned film boiling method is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program. In this case, the program codes read from the storage medium realize the functions according to the embodiments, and the storage medium storing the program codes constitutes this invention.

Further, a storage medium, such as a floppy disk, a hard disk, an optical disk, a magneto-optical disk, CD-ROM, CD-R, DVD-ROM, DVD-R, DVD-R/W, DVD-RAM, a magnetic tape, a non-volatile type memory card, and ROM, can be used for providing the program codes.

Furthermore, besides the aforesaid functions according to the above embodiments being realized by executing the program codes which are read by a computer, the present invention includes a case where an OS (operating system) or the like working on the computer performs a part of or entire processes in accordance with designations of the program codes and realizes functions according to the above embodiments.

Furthermore, the present invention also includes a case where, after the program codes read from the storage medium are written in a function expansion card, which is inserted into the computer or in a memory provided in a function expansion unit which is connected to the computer, a CPU or the like contained in the function expansion card or unit performs a part of or entire processes in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which performs printing by driving a printhead on the basis of print data transmitted from a host apparatus, comprising:

scanning means for scanning the printhead with respect to a printing medium in a main scanning direction;

a print buffer used to store print data transmitted from the host apparatus and transfer the print data to the printhead, and capable of storing print data smaller in amount than a print data amount for performing printing by scanning the printhead by a width scannable by said scanning means;

printing means for dividing said print buffer into a plurality of blocks, reading out print data for each divided block, transferring the print data to the printhead, and performing printing while scanning the printhead by said scanning means;

sampling means for sampling part of print data stored in a final block of said print buffer; and control means for, as for printing using the print data stored in the final block, performing printing by one scanning of the printhead using the print data stored in all blocks except the final block and the print data sampled by said sampling means, and performing printing by next scanning of the printhead using remaining data sampled by said sampling means and print data newly stored in all the blocks except the final block.

2. The apparatus according to claim 1, further comprising buffer input/output means for mapping the print data in said print buffer composed of the plurality of blocks every time reading out of print data from each block for printing by the printhead is completed.

3. The apparatus according to claim 1, wherein said print buffer has a ring buffer structure in which the plurality of blocks are cyclically used.

4. The apparatus according to claim 1, wherein said sampling means comprises a mask ROM.

5. The apparatus according to claim 4, wherein the mask ROM stores a sampling pattern used to sample, by 50% into a zigzag pattern, print data corresponding to pixels which have a two-dimensional layout in a print image on a printing medium.

6. The apparatus according to claim 1, wherein said sampling means uses different sampling patterns for respective color components of color print data when color printing is performed.

7. The apparatus according to claim 6, wherein said sampling means stores different sampling patterns in a mask ROM for the respective color components.

8. The apparatus according to claim 1, wherein said scanning means comprises a carriage.

9. The apparatus according to claim 1, wherein the printhead comprises an inkjet printhead, and the inkjet printhead has an electrothermal transducer which generates heat energy to be applied to ink in order to discharge the ink by using the heat energy.

10. A print control method in a printing apparatus having scanning means for scanning a printhead with respect to a printing medium in a main scanning direction, and a print buffer capable of storing print data smaller in amount than a print data amount for performing printing by scanning the printhead by a width scannable by the scanning means, comprising:

a printing step of dividing the print buffer into a plurality of blocks, reading out print data for each divided block, and performing printing while scanning the printhead by the scanning means;

a sampling step of sampling part of print data stored in a final block of the print buffer; and a print control step of, as for printing using the print data stored in the final block, performing printing by one scanning of the printhead using the print data stored in all blocks except the final block and the print data sampled in said sampling step, and performing printing by next scanning of the printhead using remaining data sampled in said sampling step and print data newly stored in all the blocks except the final block.

11. A printing apparatus which prints an image by scanning a carriage holding a printhead with respect to a printing medium on the basis of image data received from a host apparatus for each of data frames obtained by dividing, by a predetermined number, image data necessary to print an image by one scanning at a width corresponding to a number of nozzles of the printhead, comprising:

detection means for detecting whether interruption occurs during printing due to a data frame reception delay;

sampling means for, when the interruption is detected, sampling at least part of image data contained in a data frame received immediately before the reception delay so as to generate first and second data which have a complementary relationship with each other;

addition means for adding the second data to a data frame received after the interruption; and control means for controlling to print an image based on the first data before the interruption of printing, and print an image based on the second data on an area of the printing medium where the image based on the first data has been printed after the interruption of printing, wherein said sampling means regards the first and second data as first and second data groups divided by the same number, and samples respective data belonging to the first and second data groups at different sampling ratios.

12. The apparatus according to claim 11, wherein said detection means detects that interruption occurs during image printing when a time until a next data frame is received after the data frame is received exceeds a predetermined time.

13. The apparatus according to claim 11, wherein said sampling means performs sampling processing so as to increase stepwise the sampling ratio of data contained in the first data group, and performs sampling processing so as to decrease stepwise the sampling ratio of data contained in the second data group.

14. apparatus according to claim 11, wherein said addition means extracts the second data from the data frame received immediately before the reception delay, and adds the second data to a data frame first transmitted after the reception delay.

15. The apparatus according to claim 14, wherein said addition means adds the second data to a heading portion of a data frame first transmitted after the reception delay.

16. The apparatus according to claim 11, wherein the printhead comprises an inkjet printhead which discharges ink to perform printing, and the inkjet printhead has an electrothermal transducer which generates heat energy to be applied to ink in order to discharge the ink by using the heat energy.

17. A printing apparatus control method of printing an image by scanning a carriage holding a printhead with respect to a printing medium on the basis of image data received from a host apparatus for each of data frames obtained by dividing, by a predetermined number, image data necessary to print an image by one scanning at a width corresponding to a number of nozzles of the printhead, comprising:

a detection step of detecting whether interruption occurs during image printing due to a data frame reception delay;

a sampling step of, when the interruption is detected, sampling at least part of image data contained in a data frame received immediately before the reception delay so as to generate first and second data which have a complementary relationship with each other;

an addition step of adding the second data to a data frame received after the interruption; and a control step of controlling to print an image based on the first data before the interruption of printing, and print an image based on the second data on an area of the printing medium where the image based on the first data has been printed after the interruption of printing, wherein, in said sampling step, the first and second data are regarded as first and second data groups divided by the same number, and respective data belonging to the first and second data groups are sampled at different sampling ratios.

18. A control program of controlling a printing apparatus which prints an image by scanning a carriage holding a printhead with respect to a printing medium on the basis of image data received from a host apparatus for each of data frames obtained by dividing, by a predetermined number, image data necessary to print an image by one scanning at a width corresponding to a number of nozzles of the printhead, comprising:

a code for executing processing of detecting whether interruption occurs during printing due to a data frame reception delay;

a code for executing, when the interruption is detected, processing of sampling at least part of image data contained in a data frame received immediately before the reception delay so as to generate first and second data which have a complementary relationship with each other;

a code for executing processing of adding the second data to a data frame received after the interruption; and a code for executing control processing so as to print an image based on the first data before the interruption of printing, and print an image based on the second data on an area of the printing medium where the image based on the first data has been printed after the interruption of printing, wherein, in the sampling, the first and second data are regarded as first and second data groups divided by the same number, and respective data belonging to the first and second data groups are sampled at different sampling ratios.

19. A computer-readable storage medium which stores a control program of controlling an image printing apparatus which prints an image by scanning a carriage holding a printhead with respect to a printing medium on the basis of image data received from a host apparatus for each of data frames obtained by dividing, by a predetermined number, image data necessary to print an image by one scanning at a width corresponding to a number of nozzles of the printhead, the control program comprising:

a code for executing processing of detecting whether interruption occurs during printing due to a data frame reception delay;

a code for executing, when the interruption is detected, processing of sampling at least part of image data contained in a data frame received immediately before the reception delay so as to generate first and second data which have a complementary relationship with each other;

a code for executing processing of adding the second data to a data frame received after the interruption; and a code for executing control processing so as to print an image based on the first data before the interruption of printing, and print an image based on the second data on an area of the printing medium where the image based on the first data has been printed after the interruption of printing, wherein, in the sampling, the first and second data are regarded as first and second data groups divided by the same number, and respective data belonging to the first and second data groups are sampled at different sampling ratios.

* * * * *

UNITED STATES PATENT AND TRADEMARK OFFICE
CERTIFICATE OF CORRECTION

PATENT NO. : 6,908,175 B2
DATED : June 21, 2005
INVENTOR(S) : Kikuta et al.

It is certified that error appears in the above-identified patent and that said Letters Patent is hereby corrected as shown below:

Column 11,
Line 3, "amount." should read -- amount --.

Column 19,
Line 7, "m" should read -- III --.
Line 25, "delays" should read -- delay, --.

Column 20,
Line 37, "increased (20% 40%" should read -- increased (20% → 40% → --.
Line 38, "60% 80%). The" should read -- 60% → 80%). The --.

Column 21,
Line 10, "c1" should read -- $c_1$ --.

Signed and Sealed this

Fourth Day of April, 2006

JON W. DUDAS
*Director of the United States Patent and Trademark Office*